(12) United States Patent
Kotrla et al.

(10) Patent No.: US 11,643,035 B2
(45) Date of Patent: May 9, 2023

(54) RECREATIONAL OFF-HIGHWAY VEHICLE FRONT STRUCTURE

(71) Applicant: YAMAHA HATSUDOKI KABUSHIKI KAISHA, Shizuoka (JP)

(72) Inventors: Keith E. Kotrla, Montgomery, TX (US); Michael P. Deschamps, Sharpsburg, GA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 825 days.

(21) Appl. No.: 16/529,488

(22) Filed: Aug. 1, 2019

(65) Prior Publication Data
US 2021/0031713 A1 Feb. 4, 2021

(51) Int. Cl.
*B60R 19/48* (2006.01)
*B60G 21/055* (2006.01)
*B62D 21/18* (2006.01)

(52) U.S. Cl.
CPC ............ *B60R 19/48* (2013.01); *B60G 21/055* (2013.01); *B62D 21/183* (2013.01); *B60G 2300/124* (2013.01); *B60Y 2200/20* (2013.01)

(58) Field of Classification Search
CPC .................. B60R 19/48; B60G 21/055; B60G 2300/124; B60G 7/001; B60G 21/0551; B60G 2200/144; B60G 2202/312; B60G 2204/1224; B60G 2204/129; B60G 2204/43; B60G 2206/124; B60G 2206/16; B60G 3/20; B62D 21/183; B62D 23/005; B60Y 2200/20
See application file for complete search history.

(56) References Cited

U.S. PATENT DOCUMENTS

| | | | | |
|---|---|---|---|---|
| 2,770,453 A * | 11/1956 | Cuskie | ............... | B60G 21/0551 267/189 |
| 4,542,920 A * | 9/1985 | Kijima | ................. | B60G 21/055 267/248 |
| 6,431,569 B2 * | 8/2002 | Handa | ..................... | B60G 3/20 280/124.138 |
| 6,752,408 B2 * | 6/2004 | La | ............................. | F16F 9/54 280/124.152 |
| 7,322,591 B2 * | 1/2008 | Seki | .................... | B60G 21/0551 280/124.152 |
| 7,584,815 B2 * | 9/2009 | Ogawa | ..................... | B60G 7/02 280/124.109 |

(Continued)

*Primary Examiner* — Paul N Dickson
*Assistant Examiner* — Timothy Wilhelm
(74) *Attorney, Agent, or Firm* — Global IP Counselors, LLP

(57) ABSTRACT

A vehicle front structure basically includes a vehicle frame, an upper suspension arm, a lower suspension arm, a sway bar and a rack and pinion steering. The upper suspension arm is pivotally coupled to the vehicle frame about first and second upper pivot points. The lower suspension arm is pivotally coupled to the vehicle frame about first and second lower pivot points. The sway bar is attached to the upper suspension arm and located above the upper suspension arm. The rack and pinion steering arranged between the upper and lower suspension arms. The rack and pinion steering is located adjacent the second upper pivot point and between the first and second upper pivot points with respect to a longitudinal vehicle direction.

14 Claims, 23 Drawing Sheets

(56) References Cited

U.S. PATENT DOCUMENTS

| | | | | |
|---|---|---|---|---|
| 7,661,687 B2* | 2/2010 | Seki | B60G 21/0551 | 280/124.135 |
| 7,845,452 B2* | 12/2010 | Bennett | B60B 3/142 | 180/376 |
| 7,934,735 B2* | 5/2011 | Kuwabara | B60G 7/001 | 280/124.135 |
| 7,946,602 B2* | 5/2011 | Shimatani | B60G 21/0551 | 280/124.152 |
| 7,950,486 B2* | 5/2011 | Van Bronkhorst | B60G 17/021 | 180/89.11 |
| 8,079,602 B2* | 12/2011 | Kinsman | B62D 21/14 | 280/5.512 |
| 8,157,044 B2* | 4/2012 | Bennett | B62K 5/01 | 180/291 |
| 8,485,303 B2* | 7/2013 | Yamamoto | B60G 3/20 | 180/311 |
| 8,517,135 B2* | 8/2013 | Schapf | B60G 3/20 | 180/233 |
| 8,746,719 B2* | 6/2014 | Safranski | B60G 3/202 | 280/124.152 |
| 8,876,162 B2* | 11/2014 | Shinbori | B60R 21/13 | 280/808 |
| 8,944,465 B2* | 2/2015 | Shinbori | B60N 2/01 | 280/756 |
| 8,998,216 B2* | 4/2015 | Maeda | B62D 21/183 | 280/5.511 |
| 9,073,454 B2* | 7/2015 | Shinbori | B60N 3/02 | |
| 9,102,205 B2* | 8/2015 | Kvien | B60G 3/20 | |
| 9,434,244 B2* | 9/2016 | Sunsdahl | B60K 17/348 | |
| 9,586,613 B2* | 3/2017 | Shinbori | B60G 7/001 | |
| 9,713,976 B2* | 7/2017 | Miller | B60K 11/06 | |
| 9,776,466 B2* | 10/2017 | Battaglia | B60G 3/18 | |
| 9,932,073 B2* | 4/2018 | Dube | B60K 13/02 | |
| 9,981,519 B2* | 5/2018 | Despres-Nadeau | B60N 2/38 | |
| 10,369,861 B2* | 8/2019 | Deckard | B62D 3/12 | |
| 10,442,264 B2* | 10/2019 | Mailhot | B60G 7/008 | |
| 10,442,458 B2* | 10/2019 | Heon | B62D 3/12 | |
| 10,457,140 B2* | 10/2019 | Bennett | B62K 5/01 | |
| 10,479,408 B2* | 11/2019 | Upah | B62D 23/005 | |
| 10,525,781 B2* | 1/2020 | Upah | B60K 17/30 | |
| 10,793,181 B2* | 10/2020 | Bennett | B62K 25/04 | |
| 10,800,224 B2* | 10/2020 | Sellars | B60G 3/225 | |
| 11,014,420 B2* | 5/2021 | Sawai | B60G 7/001 | |
| 11,117,436 B2* | 9/2021 | Chang | B60G 21/0558 | |
| 11,142,033 B2* | 10/2021 | Yoshida | B60G 3/20 | |
| 11,161,544 B2* | 11/2021 | De Grammont | B62D 7/142 | |
| 11,192,414 B1* | 12/2021 | Berardi | B60G 7/003 | |
| 2005/0073126 A1* | 4/2005 | Seki | B60G 3/20 | 280/124.152 |
| 2007/0176387 A1* | 8/2007 | Tsuruta | B60G 11/15 | 280/124.135 |
| 2009/0301830 A1* | 12/2009 | Kinsman | F16F 9/0218 | 188/289 |
| 2012/0018973 A1* | 1/2012 | Fujii | B60G 3/20 | 280/124.134 |
| 2012/0217078 A1* | 8/2012 | Kinsman | B60K 17/34 | 280/756 |
| 2015/0061275 A1* | 3/2015 | Deckard | B60R 19/48 | 280/124.135 |
| 2016/0347350 A1* | 12/2016 | Heon | B60G 13/001 | |
| 2018/0065465 A1* | 3/2018 | Ward | B62D 5/04 | |
| 2018/0178858 A1* | 6/2018 | Hollman | B62D 23/005 | |
| 2019/0217894 A1* | 7/2019 | Upah | B62D 3/126 | |
| 2019/0291521 A1* | 9/2019 | Sawai | B60G 7/005 | |
| 2019/0367086 A1* | 12/2019 | De Grammont | B60G 7/001 | |
| 2021/0031713 A1* | 2/2021 | Kotrla | B60G 7/001 | |

\* cited by examiner

RECREATIONAL OFF-HIGHWAY VEHICLE FRONT STRUCTURE

BACKGROUND

Field of the Invention

The present invention generally relates to the field of recreational off-highway vehicles. More specifically, the present invention relates to a vehicle front structure for a recreational off-highway vehicle.

Background Information

Generally, recreational off-highway vehicles are designed to be operated over rough terrain. Basically, a recreational off-highway vehicle is considered to be any small vehicle that is not street legal. In other words, a recreational off-highway vehicle is not equipped and licensed for use on public roads, while a street legal vehicle is equipped and licensed for use on public roads. These recreational off-highway vehicles are often driven on uneven terrain such as rough roads, steep inclines and declines. As a consequence of these considerations, the design of a recreational off-highway vehicle can be quite different from vehicles designed for driving on paved roads.

Various types of recreational off-highway vehicles that are designed to be primarily driven on unpaved surfaces and typically have one or more seats. One example of a recreational off-highway vehicles is a side-by-side off-road vehicle in which the driver and a passenger are seated side-by-side. Some side-by-side recreational off-road vehicles also have a second row of seats to accommodate one or more additional passengers. These recreational off-highway vehicles typically have a frame with an open cockpit, a roll cage, a steering wheel and four wheels. In the case of these side-by-side recreational off-highway vehicles, a drive source such as an internal combustion engine is utilized to drive one or more of the wheels. Typically, the drive source will be configured to drive two of the wheels or all four of the wheels. Typically, the engine is provided with a transmission that transfers power to an output shaft from a crankshaft of the engine. The output shaft drives the wheels through a drivetrain.

SUMMARY

Generally, the present disclosure is directed to various features of a vehicle front structure for a recreational off-highway vehicle. In driving various recreational off-highway vehicles on rough terrains, it has been found that it desirable to have a large wheel travel (i.e., vertical movement of the tire) to handle the rough terrain.

Accordingly, one object of the present disclosure is directed to improving a wheel travel of a vehicle front structure for a recreational off-highway vehicle.

In accordance with one aspect of the present disclosure, a vehicle front structure is provided that basically comprises a vehicle frame, an upper suspension arm, a lower suspension arm, a sway bar and a rack and pinion steering. The upper suspension arm is pivotally coupled to the vehicle frame about first and second upper pivot points. The lower suspension arm is pivotally coupled to the vehicle frame about first and second lower pivot points. The sway bar is attached to the upper suspension arm and located above the upper suspension arm. The rack and pinion steering arranged between the upper and lower suspension arms. The rack and pinion steering is located adjacent the second upper pivot point and between the first and second upper pivot points with respect to a longitudinal vehicle direction.

Also, other features, aspects and advantages of the disclosed vehicle front structure for a recreational off-highway vehicle will become apparent to those skilled in the field of recreational off-highway vehicles from the following detailed description, which, taken in conjunction with the annexed drawings, discloses several illustrative embodiments of a vehicle front structure of a recreational off-highway vehicle with various features.

BRIEF DESCRIPTION OF THE DRAWINGS

Referring now to the attached drawings which form a part of this original disclosure.

Figure 1:
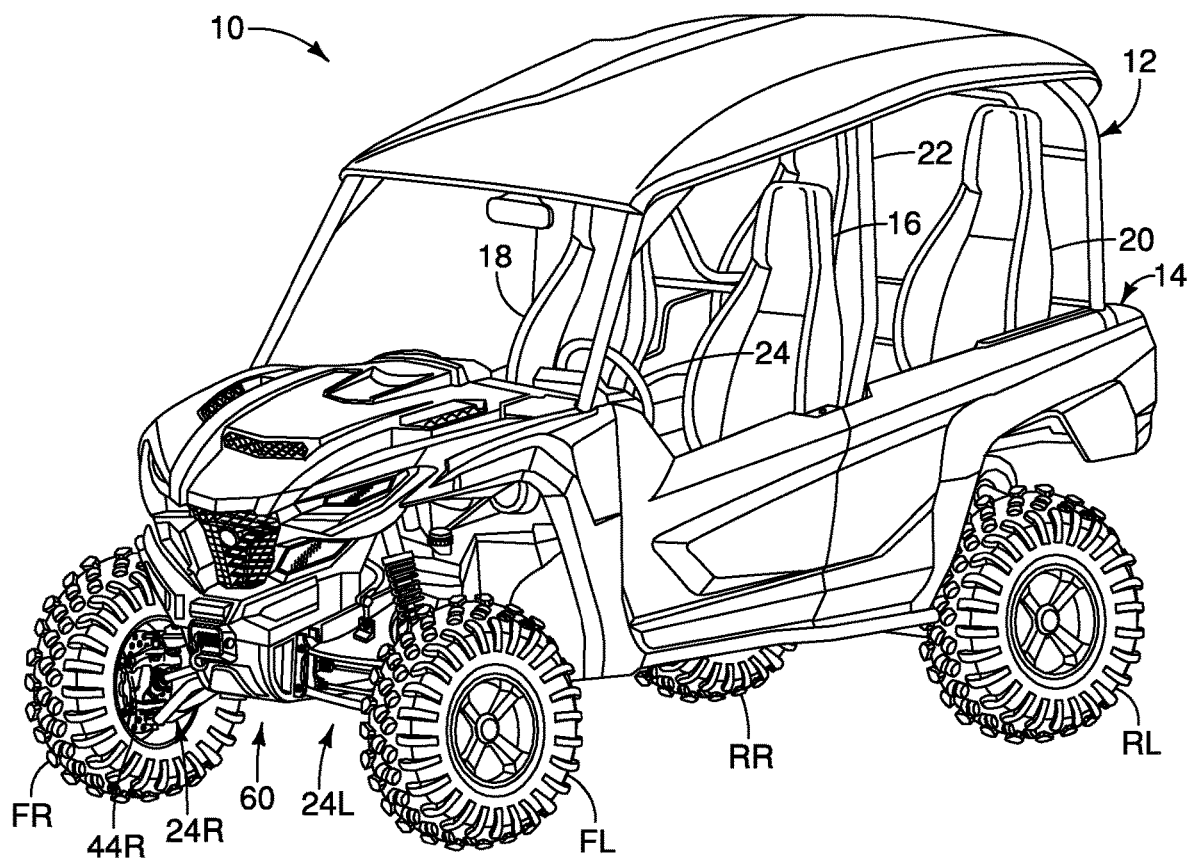
FIG. 1 is a perspective view of a recreational off-highway vehicle having a vehicle front structure in accordance with one illustrative embodiment.

It should be noted that these figures are intended to illustrate the general characteristics of methods, structure and/or materials utilized in certain illustrative embodiment and to supplement the written description provided below. These figures are to reduce scale of the actual recreational off-highway vehicle but may not precisely reflect the precise structural or performance characteristics of any given embodiment. However, the dimensional relationships and the arrangement of the parts of the recreational off-highway vehicle are accurately depicted.

DETAILED DESCRIPTION OF EMBODIMENTS

Selected embodiments will now be explained with reference to the drawings. It will be apparent to those skilled in the recreational off-highway vehicle field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Figure 2:
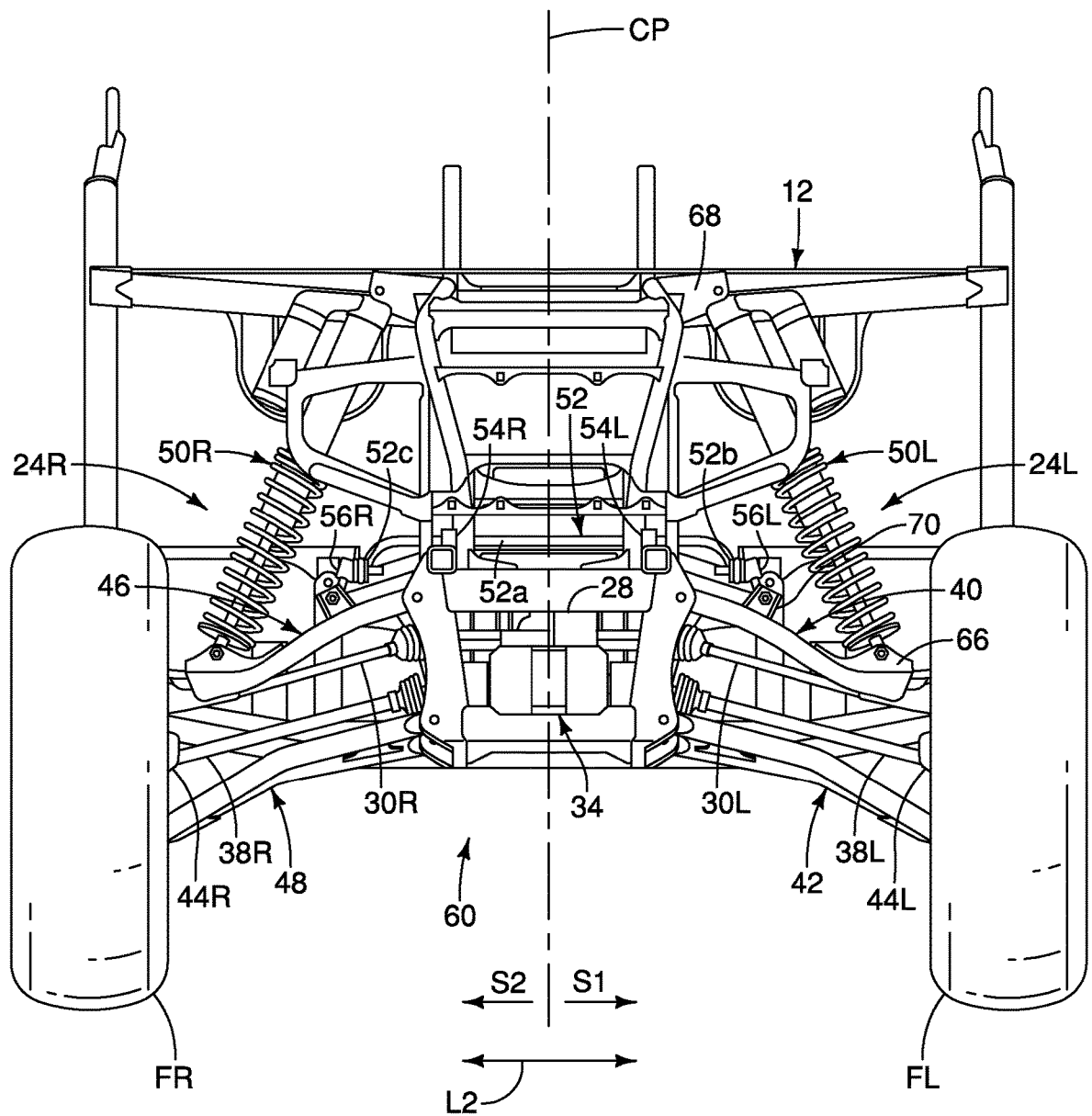
FIG. 2 is a front end elevational view of the vehicle front structure of the recreational off-highway vehicle illustrated in FIG. 1 in which the front suspension assembly is in a resting position (1 g of force—the force of gravity at the Earth's surface, which is 9.8 m/s$^2$)
Figure 3:
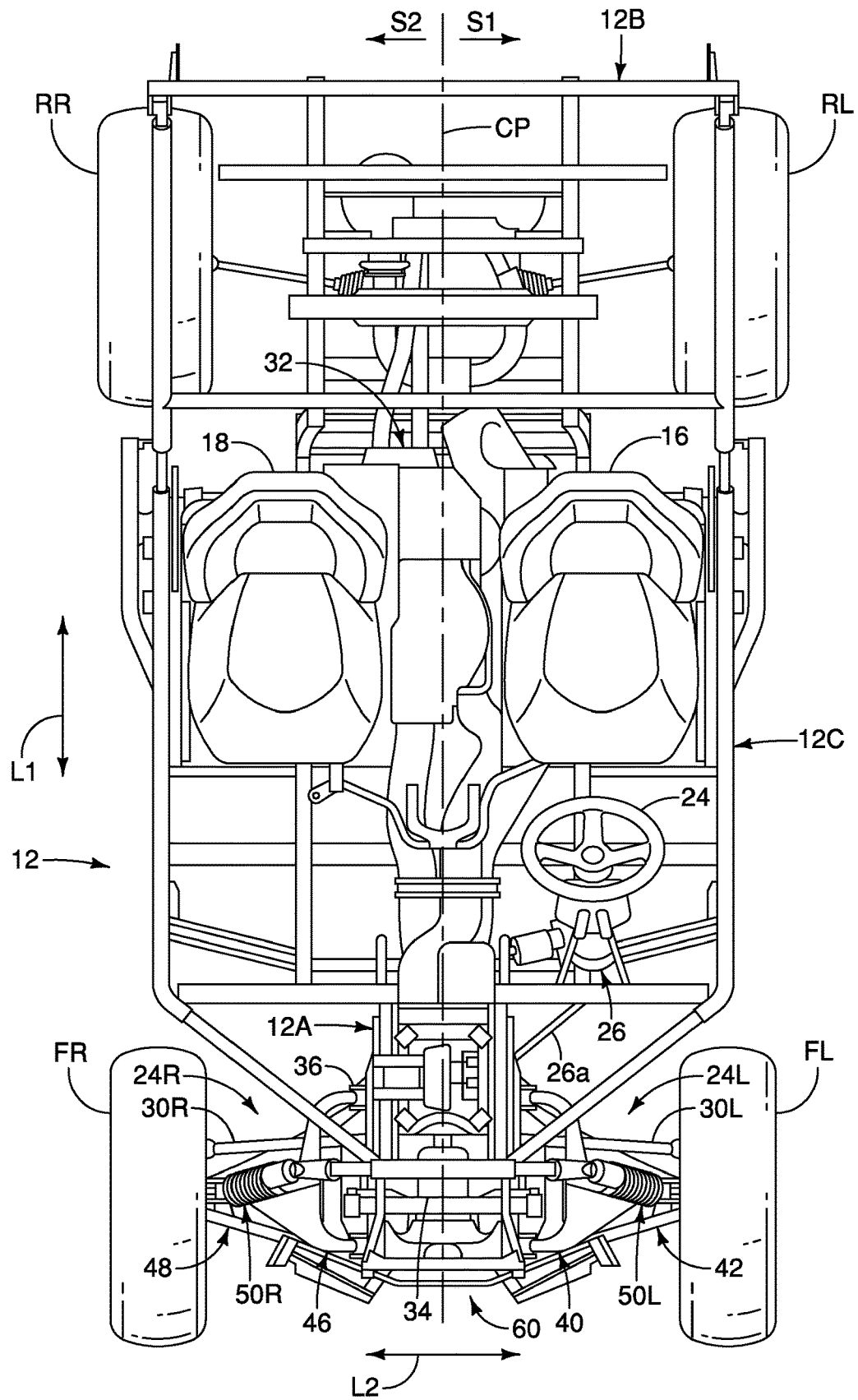
FIG. 3 is a top view of selected parts of the recreational off-highway vehicle illustrated in FIG. 1.
Figure 4:
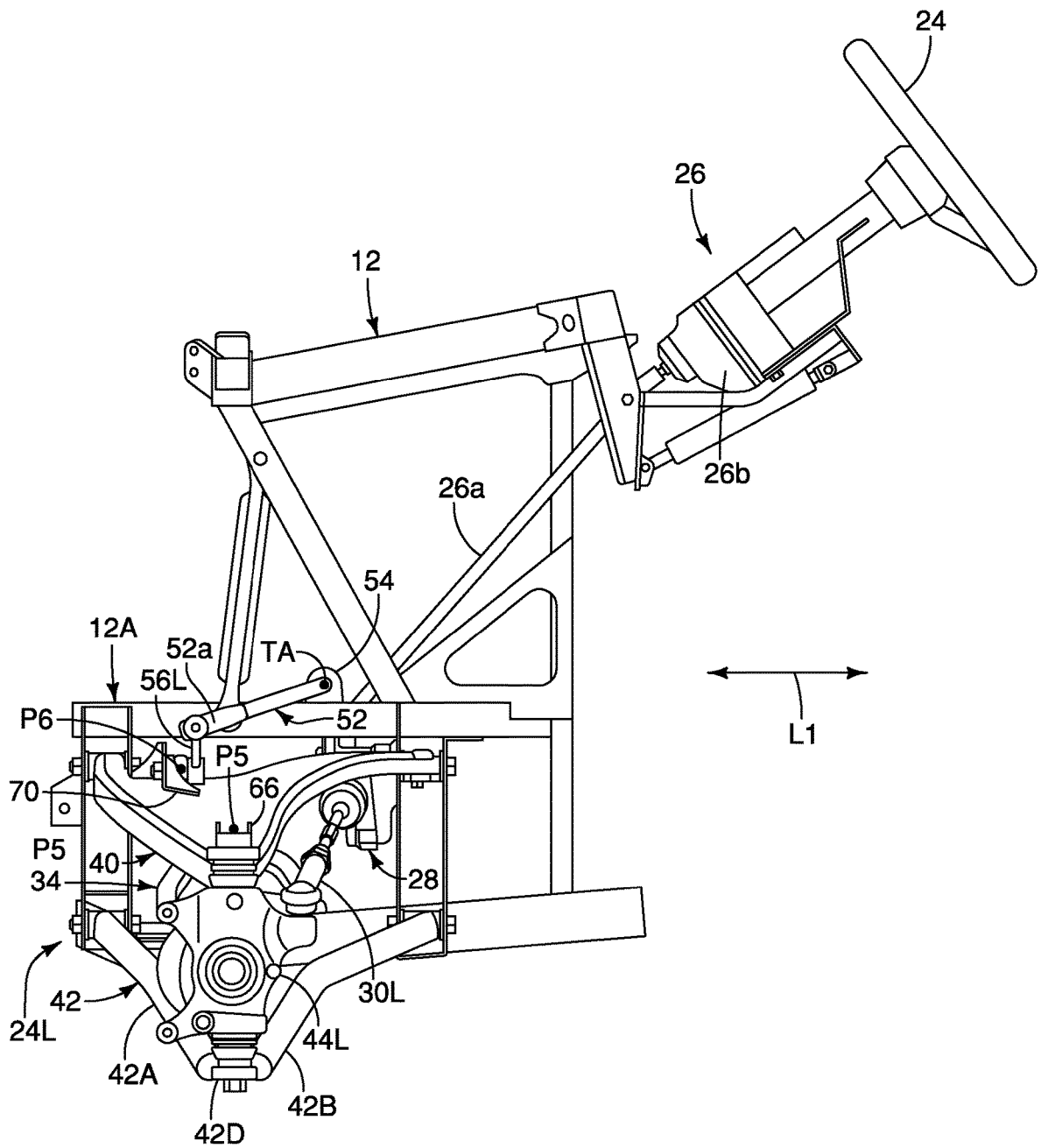
FIG. 4 is a partial left side elevational view of selected parts of the left portion of the vehicle front structure illustrated in FIG. 2 in the resting position (1 g of force)

Referring initially to FIGS. 1 to 3, a vehicle 10 is illustrated in accordance with one illustrative embodiment. Here, the vehicle 10 is a side-by-side recreational off-highway vehicle with rear seating for four people. As used herein, the term "recreational off-highway vehicle" refers to a vehicle that is not street legal (i.e. the off-highway vehicle is not equipped and licensed for use on public road). Of course, recreational off-highway vehicles such as the recreational off-highway vehicle 10 illustrated herein can be also driven on paved surfaces. In other words, in the illustrated embodiment, the vehicle 10 can be classified as a "recreational off-highway vehicle". Hereinafter, for the sake of brevity, the recreational off-highway vehicle 10 will be referred to simply as the vehicle 10.

In the following description, the terms "front" and "forward" refer to a direction in which the driver looks straight ahead while in seated driving position. Also, in the following description, the terms "rear," "rearward" and "backward" refer to a direction opposite to the front or forward direction. Further in the following description, the term "lateral side" refer to a portion of the vehicle 10 that is one or the other side of a vertical center plane CP that bisect the vehicle 10 into right and left halves. Thus, as seen in FIG. 2, the vertical center plane CP divides the vehicle 10 into a first lateral side S1 (i.e., the left side in the illustrated embodiment) and a second lateral side S2 (i.e., the right side in the illustrated embodiment). The vertical center plane CP extends in a longitudinal vehicle direction as indicated in FIG. 3. Also, in the following description, the term "lateral vehicle direction" refer to a side to side direction that is perpendicular to a straightforward driving direction and "vehicle longitudinal vehicle direction" refers a direction that is parallel to a straightforward driving direction.

The vehicle 10 basically comprises a vehicle frame 12, a vehicle body 14, a pair of front wheels FR and FL a pair of rear wheels RR and RL, a driver seat 16, a front passenger seat 18, a first rear passenger seat 20 and a second rear passenger seat 22. The vehicle body 14, the seats 16, 18, 20 and 22 are attached to the vehicle frame 12 in a conventional manner. The front wheels FR and FL are connected to the vehicle frame 12 by a pair of independent front suspensions 24R and 24L as explained below, while the rear wheels RR and RL are connected to the vehicle frame 12 by a pair of independent rear suspensions (not shown) in a conventional manner. While the vehicle 10 includes four seats, it is contemplated that the vehicle 10 can have only one seat.

Also, the vehicle 10 further comprises a steering wheel 24 is that is disposed in front of the driver seat 16. The steering wheel 24 is operatively connected to the front wheels FR and FL by a steering column 26 via a rack and pinion steering 28 for turning the front wheels FR and FL in response to turning of the steering wheel 24. In some applications, a control stick can be used in place of the steering wheel 24. Other suitable steering devices also can be used, such as, without limitation, a handlebar, one or more push-buttons, one or more foot pedals and/or the like. The rack and pinion steering 28 operatively coupled to the left front wheel FL via a tie rod 30L and operatively coupled to the right front wheel FR via a tie rod 30R. Thus, here, the front wheels FR and FL are steerable wheels for changing the travel path of the vehicle 10.

The vehicle frame 12 is typically made from a plurality of hollow tubes and a plurality of brackets that are welded to each other. It is contemplated that at least some of the hollow tubes could be replaced by other types of supports such as solid support members and/or beams. While the hollow tubes have a cylindrical cross-section, it is contemplated that cross-sections other than circular. Preferably, the hollow tubes, the beams and the brackets are preferably made of a suitable rigid metallic material such as steel, aluminum, titanium, etc. It is also contemplated that at least some of the hollow tubes, the beams, and the brackets could be made of a non-metallic material, such as reinforced composite materials such as fiber reinforced plastics. It is also contemplated that at least some of the members and brackets could be joined to each other by means other than welding, such as by fastening and bonding for example. It is also contemplated that two or more of the hollow tubes, the beams, and the brackets described below could be cast or otherwise formed as a single component. It is also contemplated that the vehicle frame 12 could have more or less the hollow tubes, the beams, and the brackets than illustrated below depending on the type of materials used, the required strength and rigidity of the vehicle frame 12 and the weight of the components attached to the vehicle frame 12 for example.

As seen in FIGS. 1 to 3, the vehicle body 14 is provided to the vehicle frame 12 in a conventional manner. The vehicle frame 12 has a front frame 12A, a rear frame 12B and an intermediate frame 12C defining an open passenger compartment between the front and rear frames 12A and 12B. The front wheels FR and FL support the front frame 12A of the vehicle frame 12 by the front suspensions 24R and 24L. The rear wheels RR and RL supports the rear frame 12B of the vehicle frame 12 by the rear suspensions (not shown). The vertical center plane CP is equally spaced from the wheels FR and FL.

As seen in FIG. 1, the vehicle body 14 is supported by the vehicle frame 12 in a conventional manner. The vehicle body 14 includes a plurality of body panels that are connected the vehicle frame 12. The body panels of the vehicle body 14 aid in protecting various components of the vehicle 10 and provide some of the aesthetic features of the vehicle 10. In some applications of the vehicle 10, the vehicle body 14 can be omitted. Since the body panels of the vehicle body 14 does not directly affect the front suspensions 24R and 24L, the body panels of the vehicle body 14 will not be discussed and/or illustrated in detail herein.

Figure 5:
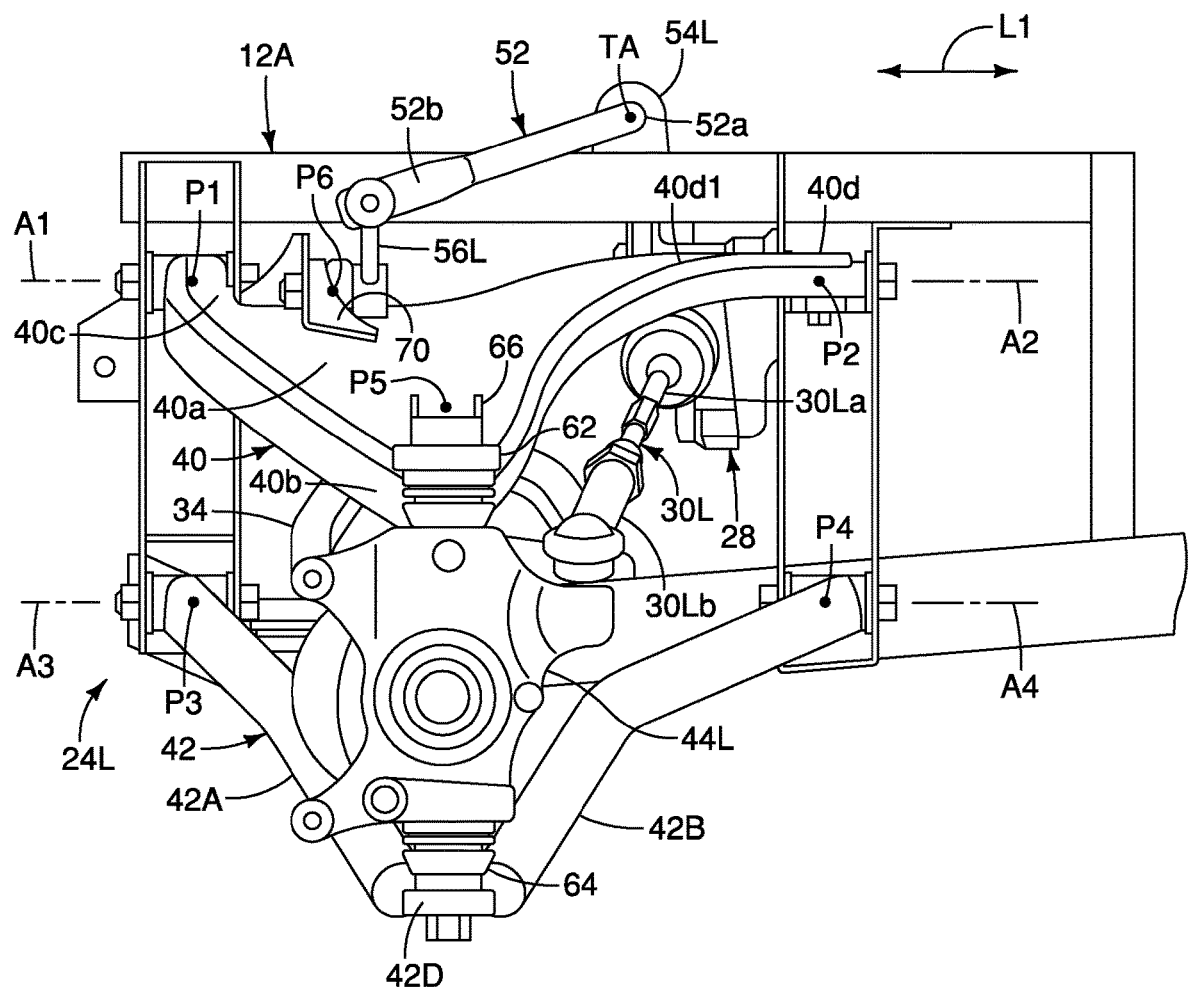
FIG. 5 is a partial left side elevational view of selected parts of the left portion of the vehicle front structure illustrated in FIG. 4 in the resting position (1 g of force)

As seen in FIG. 5, the vehicle 10 includes a drive source 32 that is supported on the intermediate frame 12C of the vehicle frame 12. Basically, the drive source 32 is an internal combustion engine. However, the drive source 32 can be an electric motor. Here, the drive source 32 is primarily located between the driver seat 16 and the front passenger seat 18. The first and second rear passenger seats 20 and 22 are located rearward of the drive source 32. The drive source 32 is operatively coupled to at least one of the wheels FR, FL, RR and RL which is a drive wheel. Preferably, the vehicle 10 is a four-wheel drive vehicle in which both the front wheels FR and FL and the rear wheels RR and RL are drive wheels for propelling the vehicle 10 along the ground. Of course, it will be apparent from this disclosure that only the rear wheels RR and RL or only the front wheels FR and FL can be drive wheels. Here, the drive source 32 is operatively coupled to all of the wheels FR, FL, RR and RL.

In the case of the front wheels FR and FL, a front differential 34 is provided on the vehicle frame 12. The front differential 34 is connected to the drive source 32 by a propeller shaft 36 and to the front wheels FR and FL by a pair of drive shafts 38R and 38L. The front differential 34 is provided on the vehicle frame 12 at a location forward and below of the rack and pinion steering 28.

As seen in FIGS. 2 and 3, each of the left and right front suspensions 24L and 24R is independently swingable (up and down) relative to the vehicle frame 12. In this way, the front wheels FL and FR are independently suspended by the left and right front suspensions 24L and 24R, respectively. The left and right front suspensions 24L and 24R are configured to have an increased amount wheel travel. The left and right front suspensions 24L and 24R are each a double A-arm suspension assembly. Basically, the left front suspension 24L includes an upper suspension arm 40 pivotally coupled to the vehicle frame 12 and a lower suspension arm 42 pivotally coupled to the vehicle frame 12. The outboard ends of the upper suspension arm 40 and the lower suspension arm 42 are coupled together by a knuckle 44L. Similarly, the right front suspension 24R includes an upper suspension arm 46 pivotally coupled to the vehicle frame 12 and a lower suspension arm 48 pivotally coupled to the vehicle frame 12. The outboard ends of the upper suspension arm 46 and the lower suspension arm 48 are coupled together by a knuckle 44R.

Still referring to FIGS. 2 and 3, the left front suspension 24L further includes a front shock absorber 50L that is coupled between the vehicle frame 12 and the upper suspension arm 40, while the right front suspension 24R further includes a front shock absorber 50R that is coupled between the vehicle frame 12 and the upper suspension arm 44. Each of the shock absorbers 50L and 50R is a conventional shock absorber that includes a coil spring disposed around a nitrogen gas shock with a separate reservoir connected to the nitrogen gas shock. Since shock absorbers of this type are well known, the shock absorbers 50L and 50R will not be described in greater detail.

As seen in FIG. 2, a sway bar 52 is connected to the left and right front suspensions 24L and 24R. In particular, the sway bar 52 has a center bar portion 52a that is pivotally attached to the vehicle frame 12 by a pair of sway bar mounts 54L and 54R. The sway bar mounts 54L and 54R are bushings that are bolted to the front frame 12A of the vehicle frame 12. The center bar portion 52a of the sway bar 52 defines a main torsion axis TA as seen in FIG. 5. The sway bar 52 has a first end portion 52b that is attached to the upper suspension arm 40 by a control link 56L. Thus, the sway bar 52 is attached to the upper suspension arm 40 and located above the upper suspension arm 40. The sway bar 52 has a second end portion 52c that is attached to the upper suspension arm 46 by a control link 56R. Thus, the sway bar 52 is attached to the upper suspension arm 46 and located above the upper suspension arm 46. The first end portion 52b and the second end portion 52c extend perpendicularly from the center bar portion 52a. In an unstressed state of the sway bar 52, the first end portion 52b and the second end portion 52c are aligned as viewed perpendicular to the vertical center plane CP. The control link 56L has one end pivotally attached to the sway bar 52 and the other end pivotally attached to the upper suspension arm 40. Likewise, the control link 56R has one end pivotally attached to the sway bar 52 and the other end pivotally attached to the upper suspension arm 46. The connections at each end of the control links 56L and 56R can be ball joints.

In the illustrated embodiment, a vehicle front structure 60 of the vehicle 10 basically includes the front frame 12A of the vehicle frame 12, the front wheels FR and FL, the rack and pinion steering 28, the right and left front suspensions 24R and 24L, the front differential 34 and the sway bar 52.

Also, the vehicle front structure 60 of the vehicle 10 further includes the tie rods 30L and 30R and the drive shafts 38R and 38L. The vehicle front structure 60 is shown in a rest or resting position in FIGS. 1 to 3. Here, the terms "rest position" and "resting position" with respect to the vehicle front structure 60 refers to the vehicle 10 being supported with a 1 g of force (i.e., the force of gravity at the Earth's surface, which is 9.8 m/s$^2$). Thus, the right and left rear suspensions 26R and 26L are shown in their rest or resting positions in FIGS. 1 to 3.

The left and right front suspensions 24L and 24R mirror images of each other. For the sake of brevity, only the left front suspension 24L will be discussed in detail herein. Accordingly, the descriptions relating to the left front suspension 24L also applies to the right front suspension 24R. Also, the left and right ends of the sway bar 52 are mirror images of each other. Again, for the sake of brevity, only the left end of the sway bar 52 will be discussed in detail herein. Accordingly, the descriptions relating to the left end of the sway bar 52 also applies to the right front suspension 24R.

Turning now to FIGS. 2 and 4 to 23, the left front suspension 24L is illustrated in more detail. The left front suspension 24L is configured to allow the left front wheel FL to move relative to the vehicle frame 12 for relative upward and downward movements in a vertical direction. Also, the left front suspension 24L is configured to allow the left front wheel FL to be turned for steering the vehicle 10 in a left direction and a right direction. As seen in FIGS. 2 and 4 to 11, the left front suspension 24L is illustrated in the rest or resting position. The left front wheel FL is shown in the straight position in FIGS. 2 and 7. The left front wheel FL is shown in the right turning position in FIGS. 8 and 9. The left front wheel FL is shown in the left turning position in FIGS. 10 and 11. As seen in FIGS. 12 to 17, the left front suspension 24L is illustrated in the full extension position. In other words, the left front suspension 24L is extended to its maximum extent. The full extension position of the left front suspension 24L can be established by one or more limit straps (not shown) that are connected between the vehicle frame 12 and the trailing arms 42R and 42L. Alternatively, the full extension positions of the left front suspension 24L can be established by the shock absorbers SOL reaching a maximum extension amount. The left front wheel FL is shown in the straight position in FIGS. 12 and 13. The left front wheel FL is shown in the right turning position in FIGS. 14 and 15. The left front wheel FL is shown in the left turning position in FIGS. 16 and 17. Turning now to FIGS. 18 to 23, the left front suspension 24L is illustrated in the full compression position. In other words, the left front suspension 24L is compressed to its maximum extent. The left front wheel FL is shown in the straight position in FIGS. 18 and 19. The left front wheel FL is shown in the right turning position in FIGS. 20 and 21. The left front wheel FL is shown in the left turning position in FIGS. 22 and 23.

Now referring back to FIGS. 5 and 6, the upper suspension arm 40 will be discussed in more detail. The upper suspension arm 40 is pivotally coupled to the vehicle frame 12 about first and second upper pivot points P1 and P2. The second upper pivot point P2 is located rearward of the first upper pivot point P1 with respect to the longitudinal vehicle direction L1. The upper suspension arm 40 is bolted to the vehicle frame 12 at the first upper pivot point P1 such that the bolt defines a first pivot axis A1, and bolted to the vehicle frame 12 at the second upper pivot point P2 such that the bolt defines a second pivot axis A2. The first and second pivot axes A1 and A2 are parallel to each other and preferably aligned.

Figure 7:
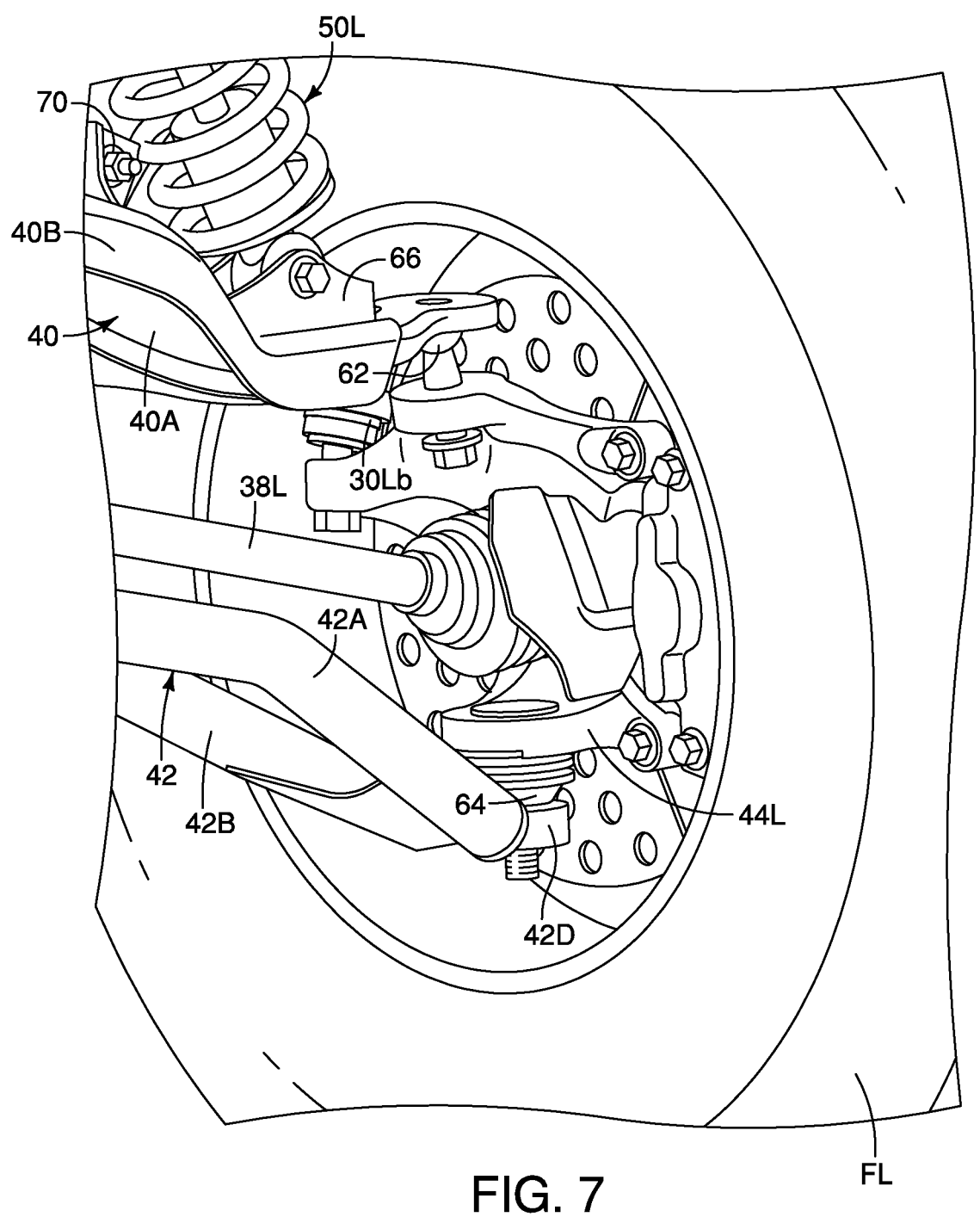
FIG. 7 is a partial perspective view of an outboard end of the vehicle front structure illustrated in FIGS. 4 to 6 with the left front wheel in a straight position and the vehicle front structure in the resting position (1 g of force)
Figure 8:
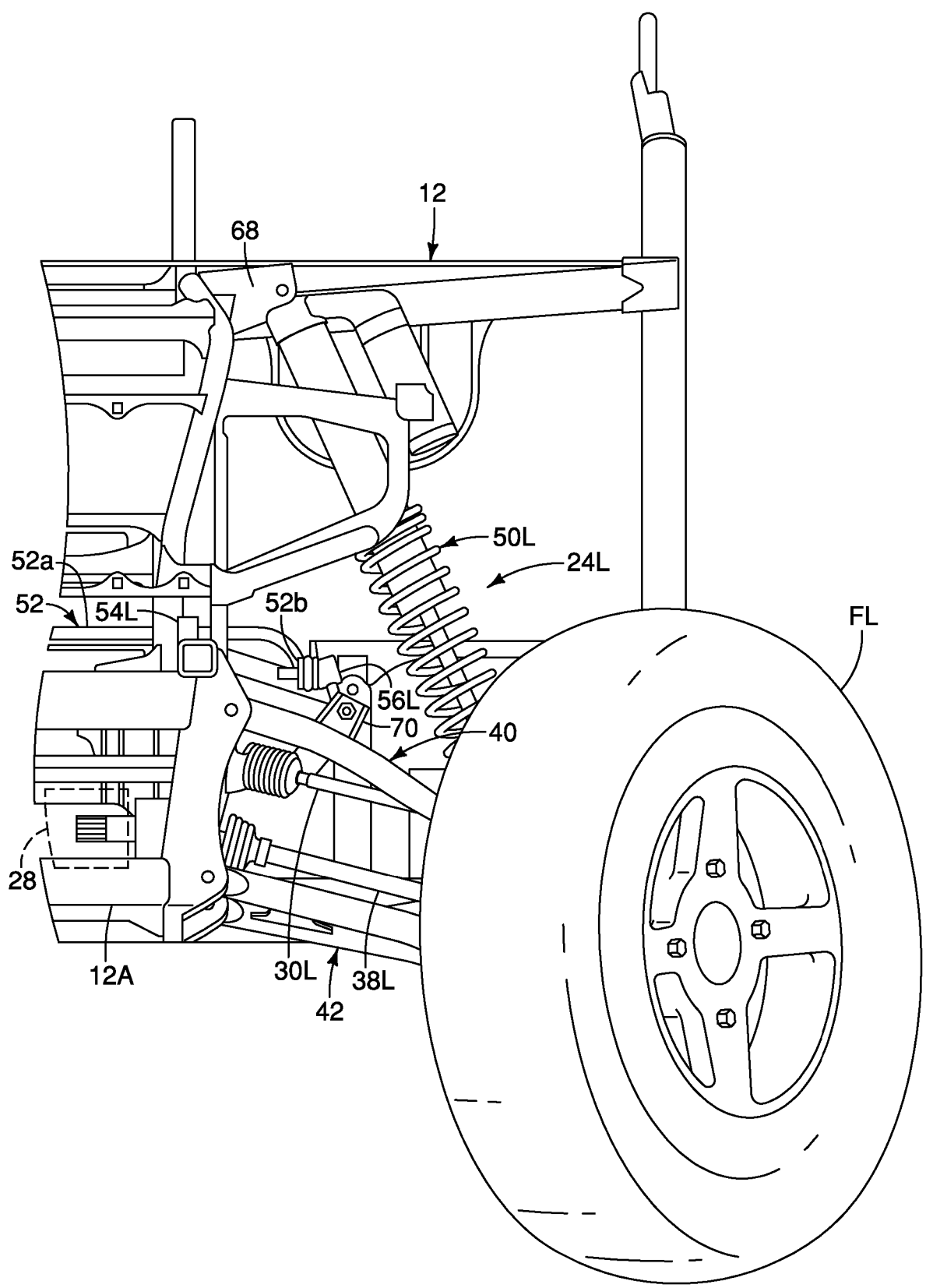
FIG. 8 is a partial front elevational view of the selected parts of the left portion of the vehicle front structure illustrated in FIGS. 4 to 7 but with the left front wheel in a right turning position and the vehicle front structure in the resting position (1 g of force)
Figure 9:
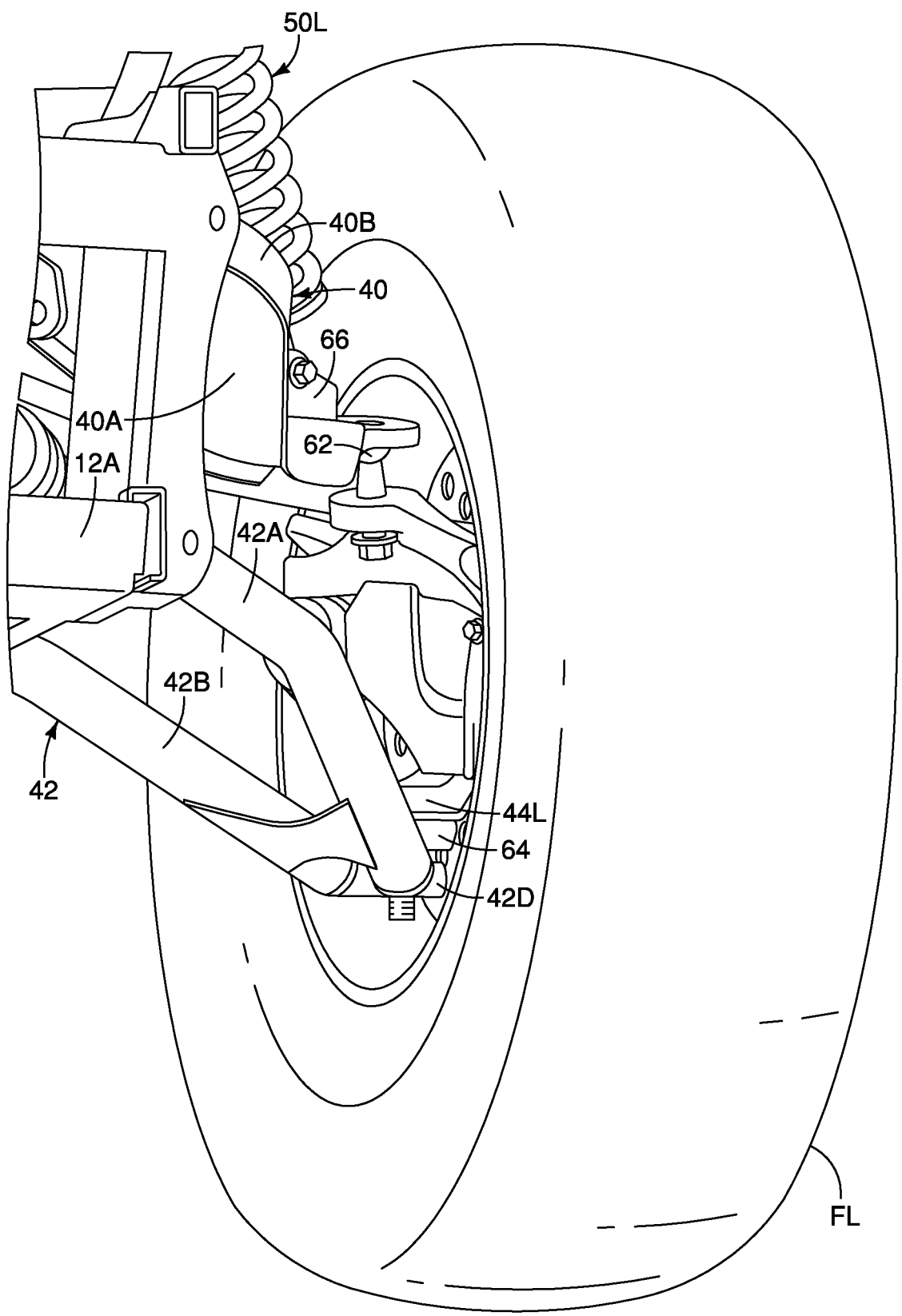
FIG. 9 is a front perspective view of the selected parts of the left portion of the vehicle front structure illustrated in FIG. 8 with the left front wheel in the right turning position and the vehicle front structure in the resting position (1 g of force)
Figure 10:
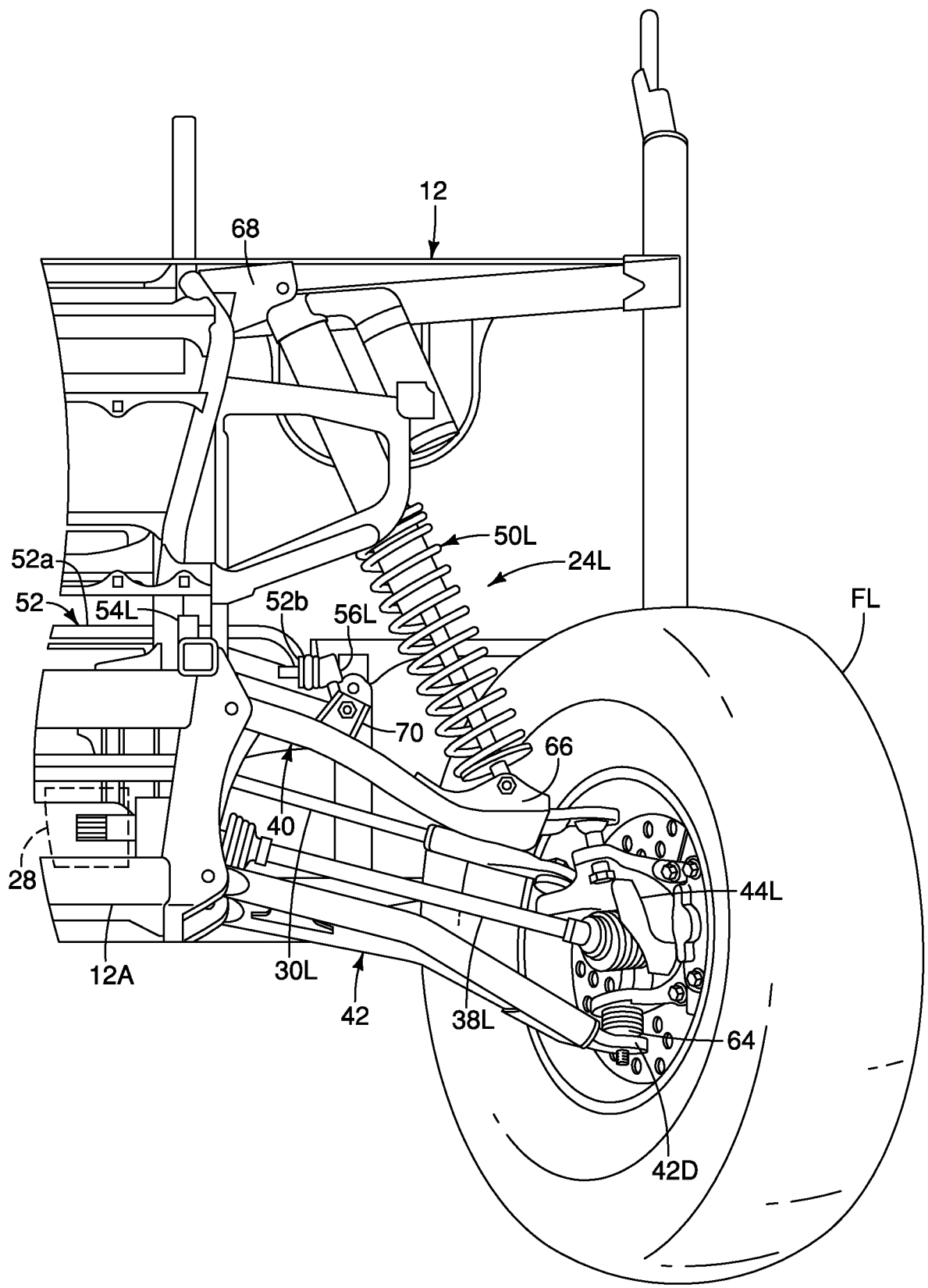
FIG. 10 is a partial front elevational view, similar to FIG. 8, of the selected parts of the left portion of the vehicle front structure illustrated in FIGS. 4 to 9 but with the left front wheel in a left turning position and the vehicle front structure in the resting position (1 g of force)
Figure 11:
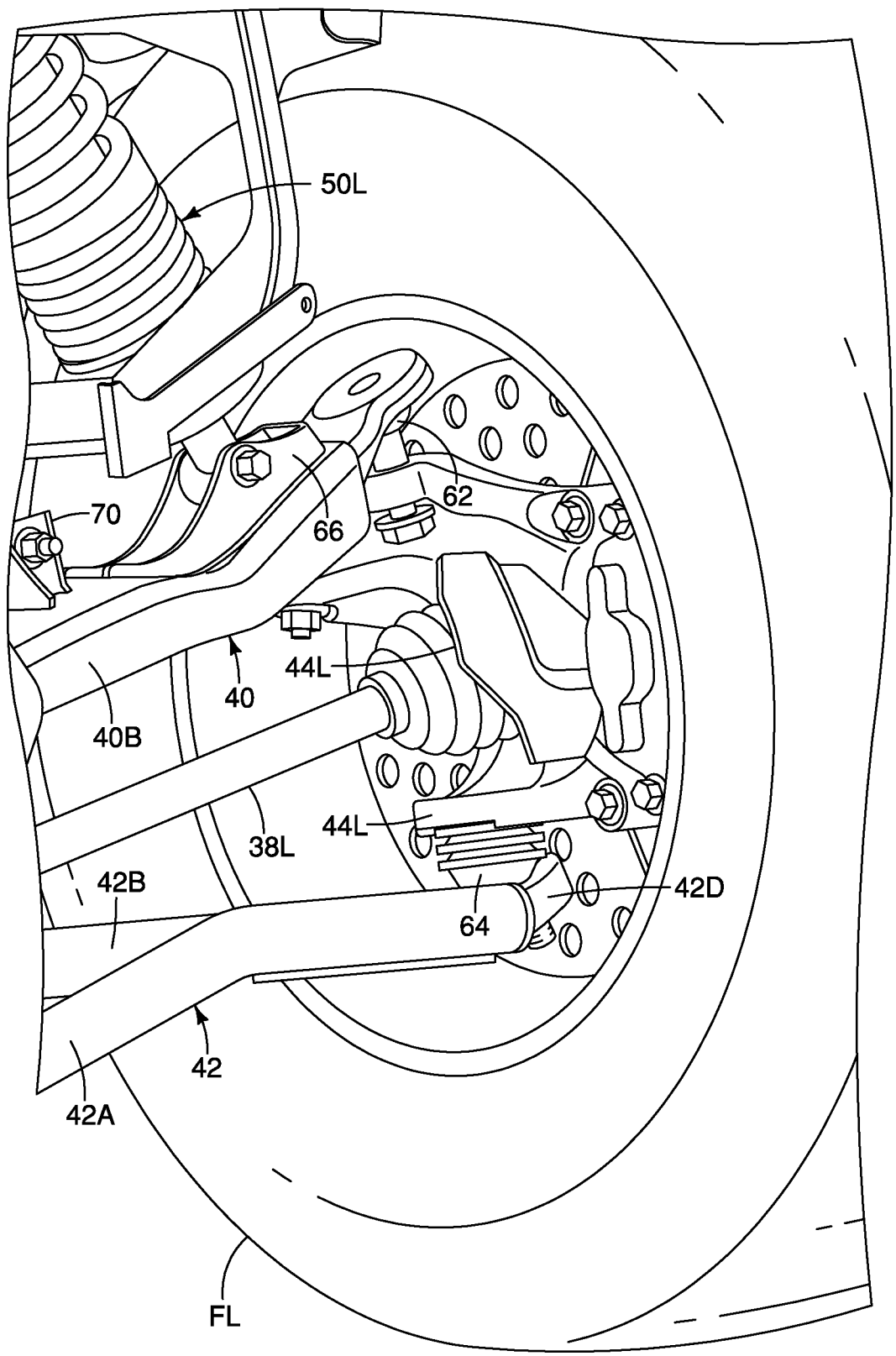
FIG. 11 is a partial front perspective view, similar to FIG. 9, of selected parts of the left portion of the vehicle front structure illustrated in FIG. 10 with the left front wheel in the left turning position and the vehicle front structure in the resting position (1 g of force)
Figure 12:
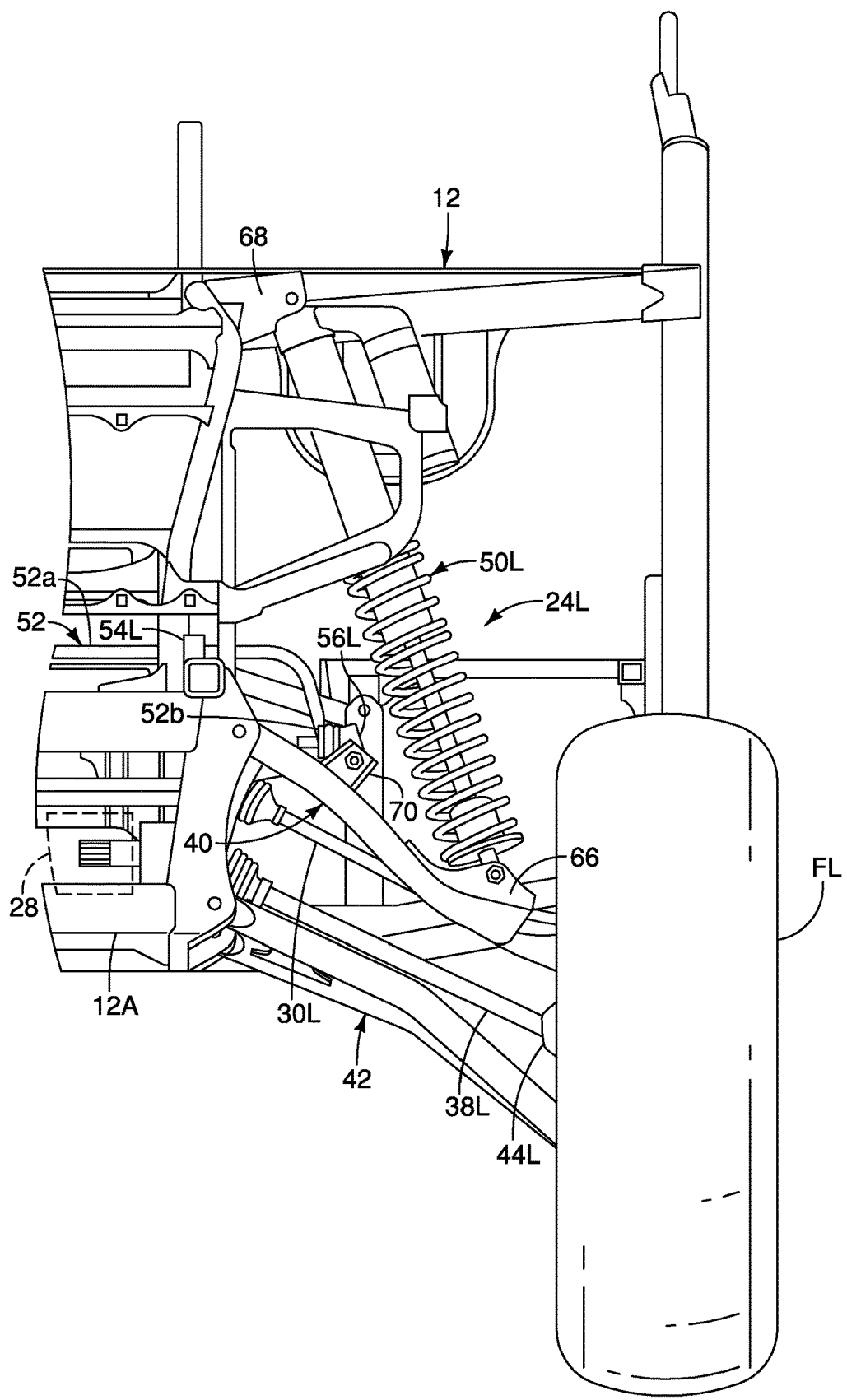
FIG. 12 is a partial front elevational view, similar to FIGS. 8 and 10, of the selected parts of the left portion of the vehicle front structure illustrated in FIGS. 4 to 11 but with the left front wheel in the straight position and the vehicle front structure in a full extension position.
Figure 13:
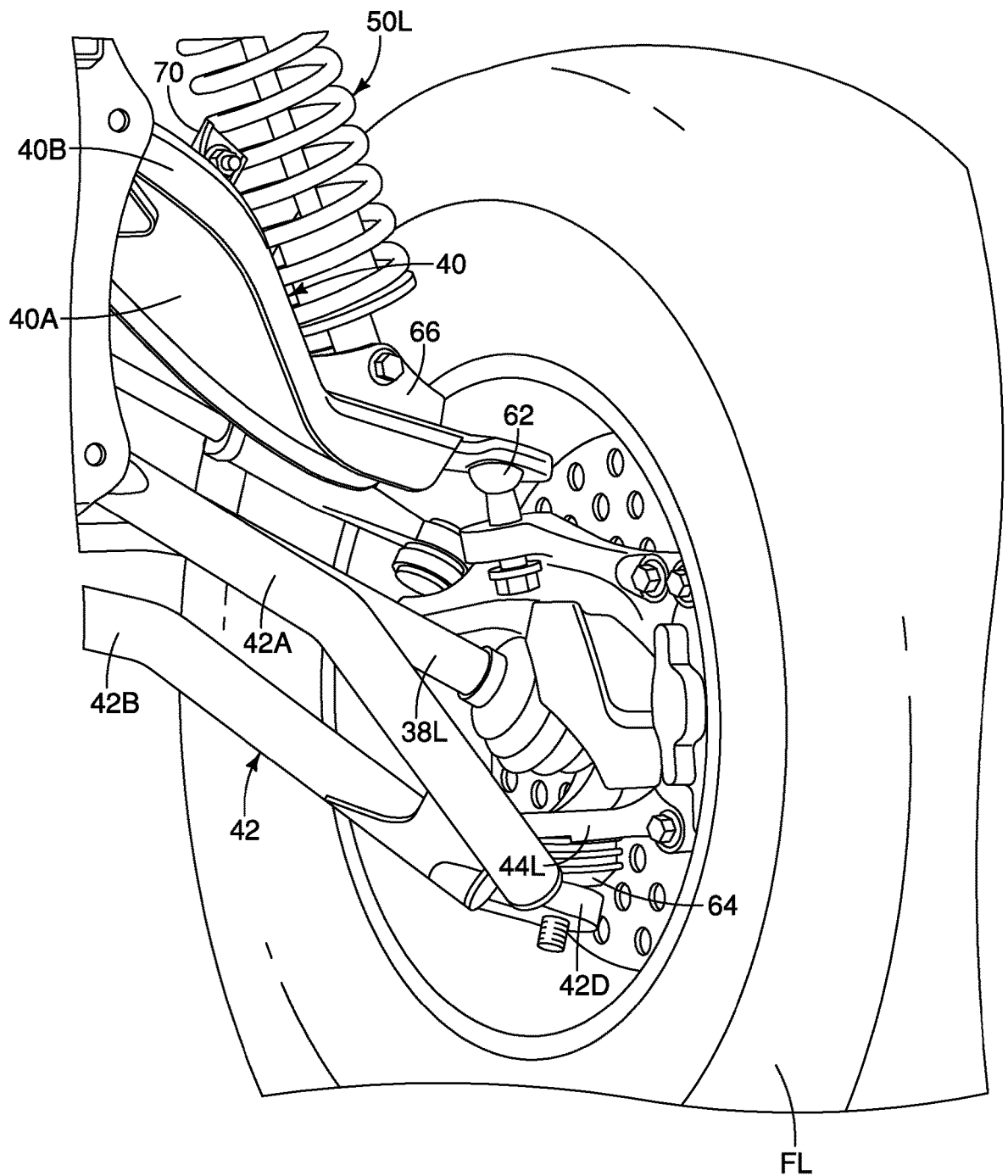
FIG. 13 is a partial front perspective view, similar to FIGS. 9 and 11, of selected parts of the left portion of the vehicle front structure illustrated in FIG. 12 with the left front wheel in the straight position and the vehicle front structure in the full extension position.
Figure 14:
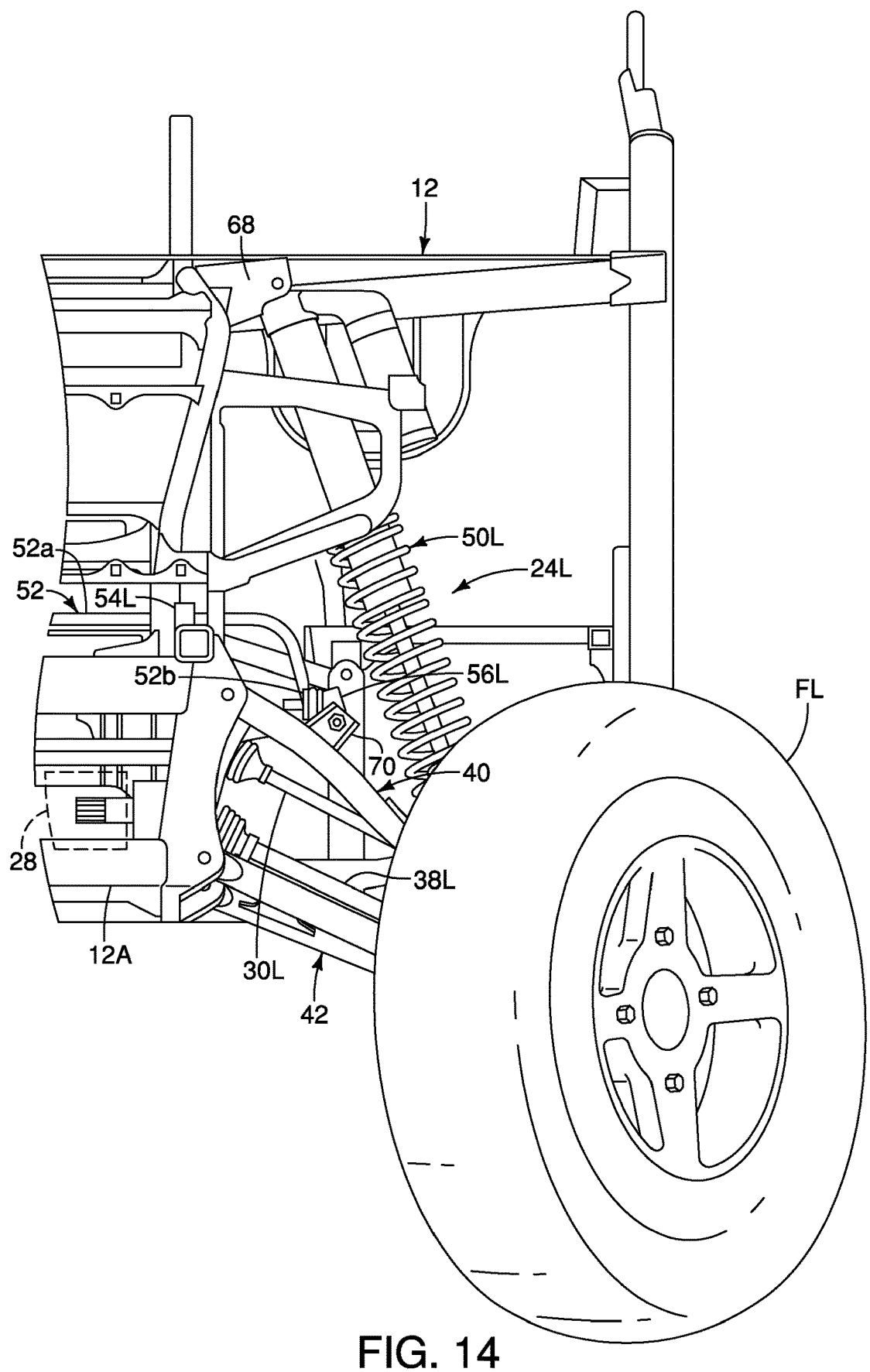
FIG. 14 is a partial front elevational view, similar to FIGS. 8, 10 and 12, of the selected parts of the left portion of the vehicle front structure illustrated in FIGS. 4 to 13 but with the left front wheel in the right turning position and the vehicle front structure in the full extension position.
Figure 15:
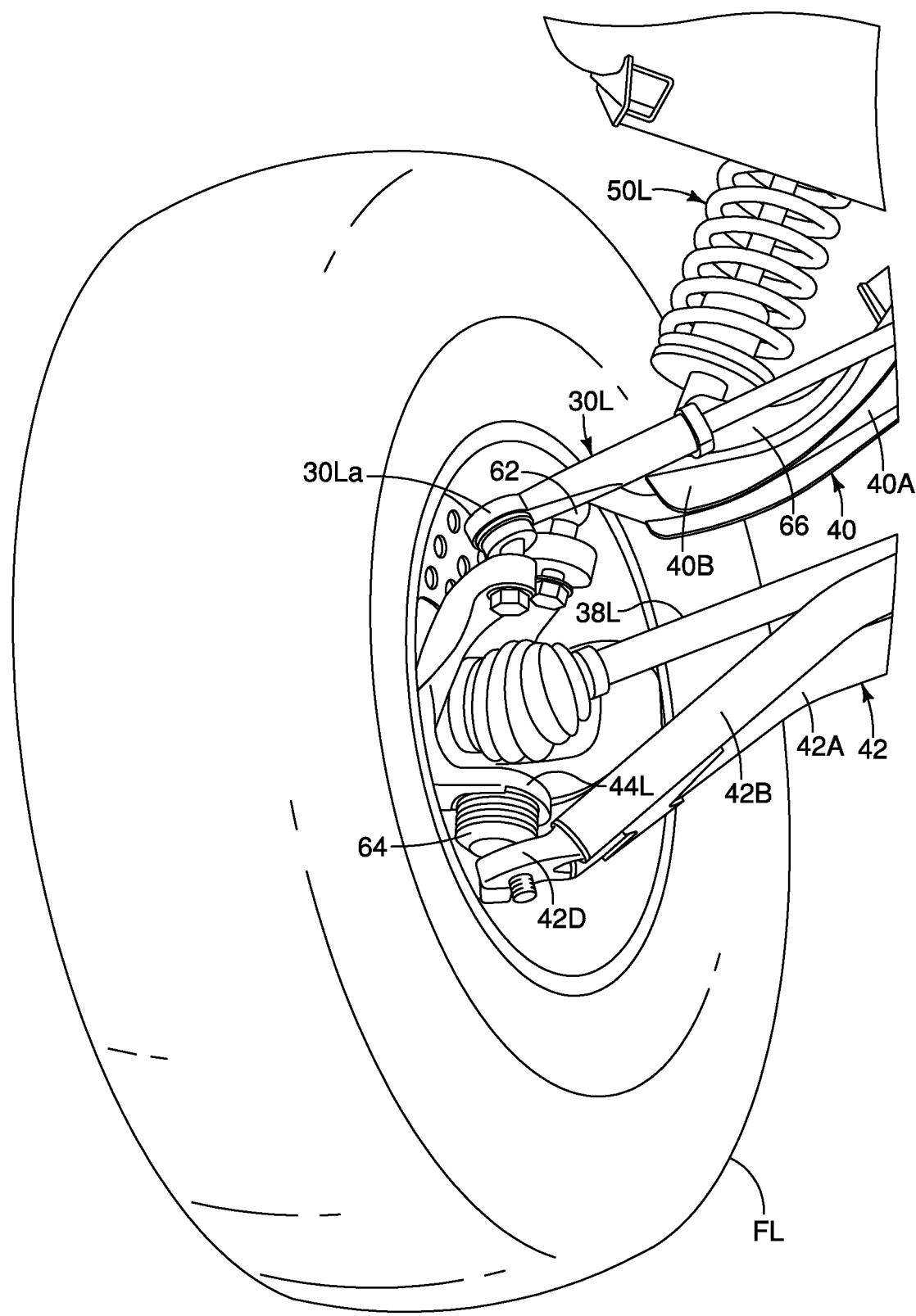
FIG. 15 is a partial rear perspective view of selected parts of the left portion of the vehicle front structure illustrated in FIG. 14 with the left front wheel in the right turning position and the vehicle front structure in the full extension position.
Figure 16:
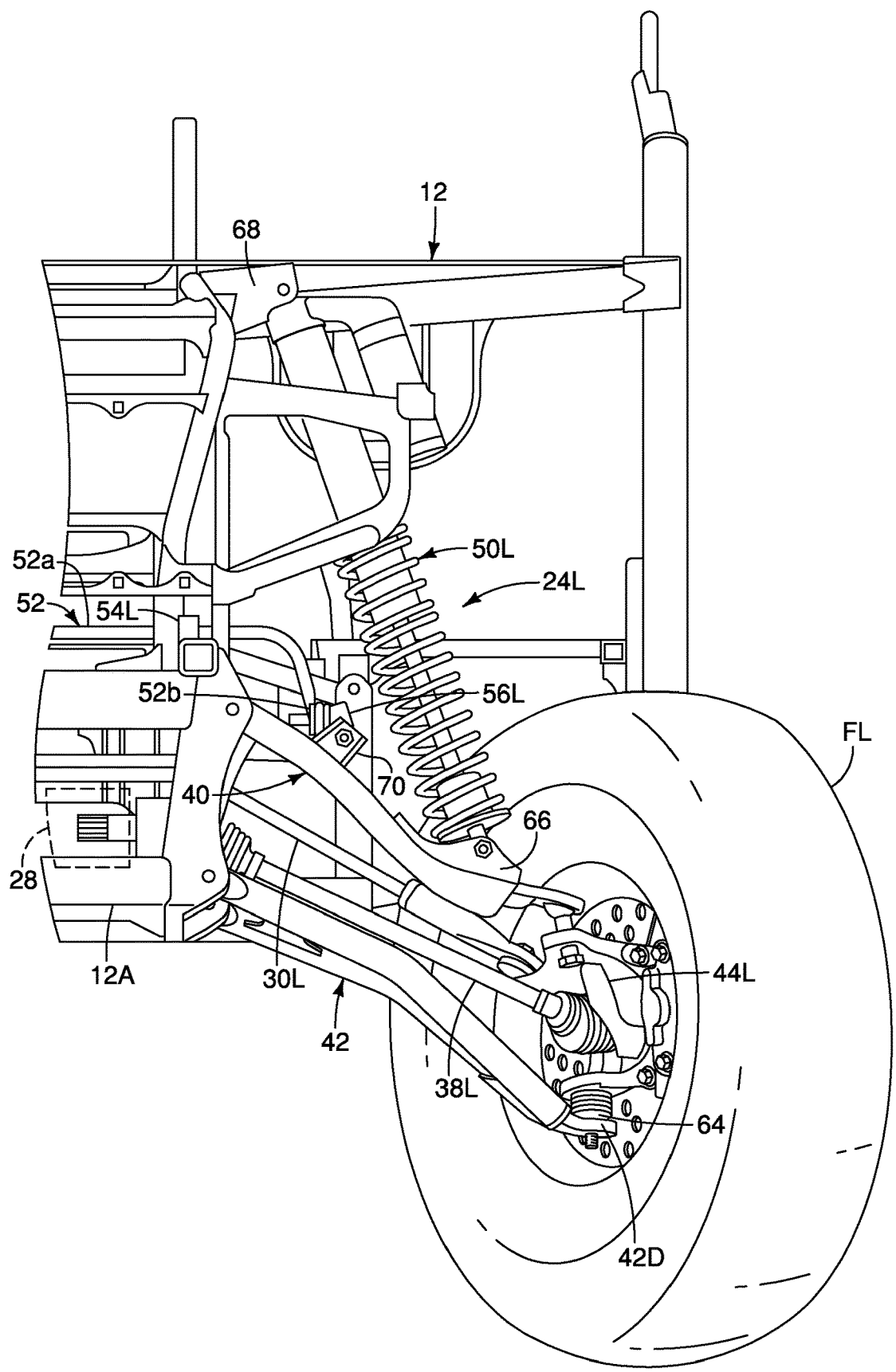
FIG. 16 is a partial front perspective view, similar to FIGS. 9, 11 and 13, of selected parts of the vehicle front structure illustrated in FIG. 12 with the left front wheel in the left turning position and in the full extension position.
Figure 17:
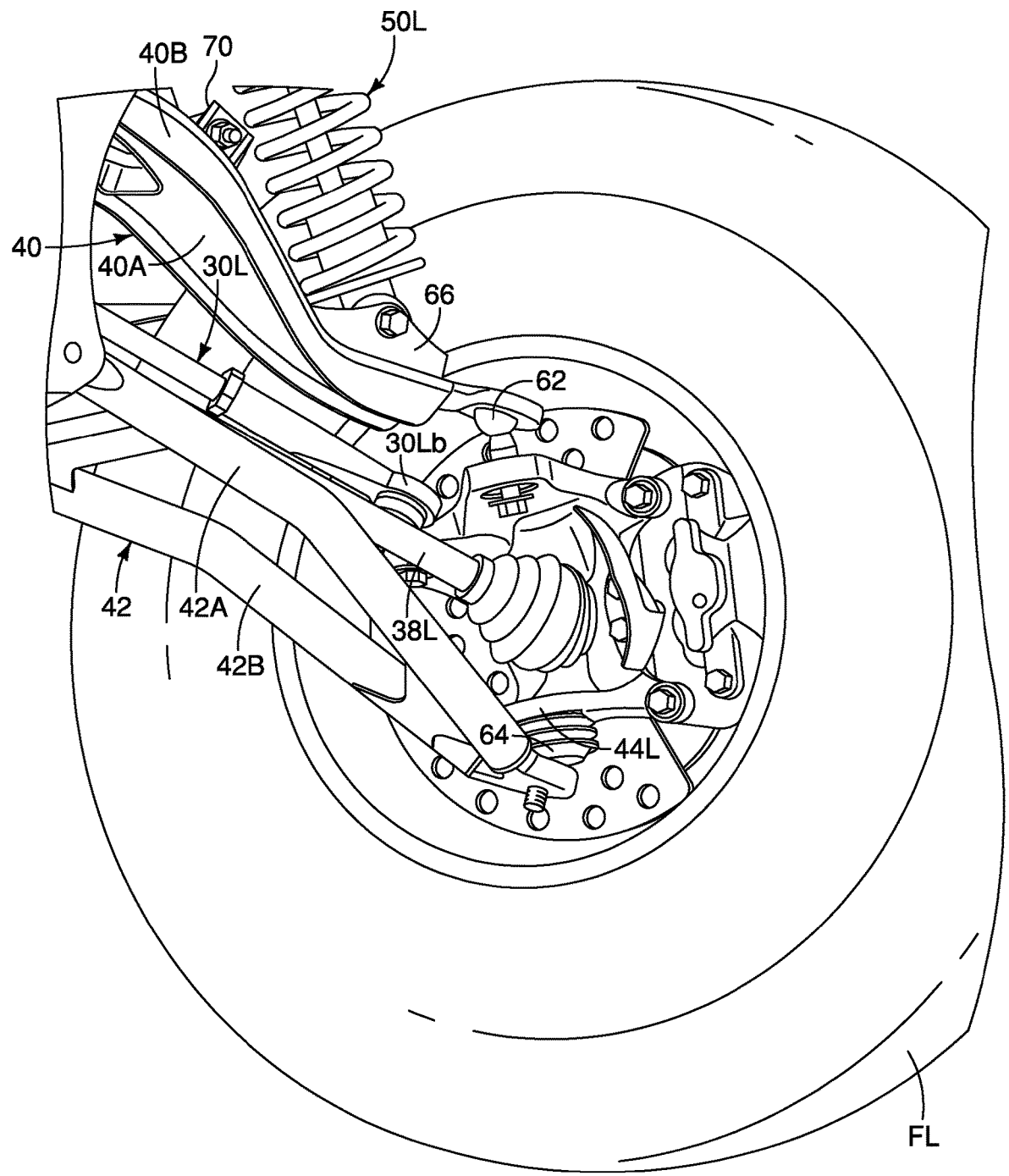
FIG. 17 is an enlarged, partial front perspective view, similar to FIG. 16, of the selected parts of the left portion of the vehicle front structure illustrated in FIGS. 4 to 16 but with the left front wheel in the left turning position and the vehicle front structure in the full extension position.
Figure 18:
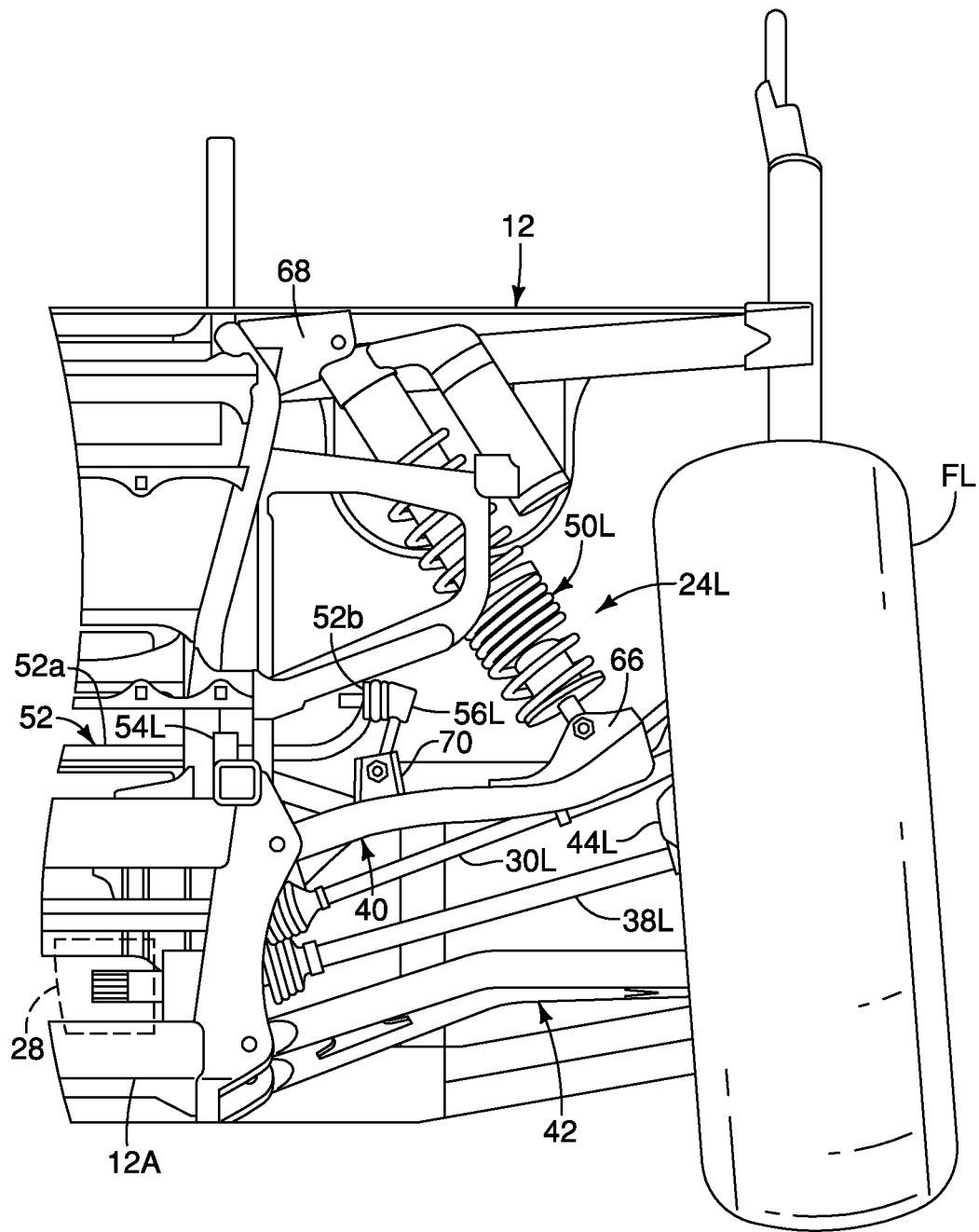
FIG. 18 is a partial front elevational view, similar to FIGS. 8, 10, 12 and 14, of the selected parts of the left portion of the vehicle front structure illustrated in FIGS. 4 to 17 but with the left front wheel in the straight position and the vehicle front structure in the full compression position.
Figure 19:
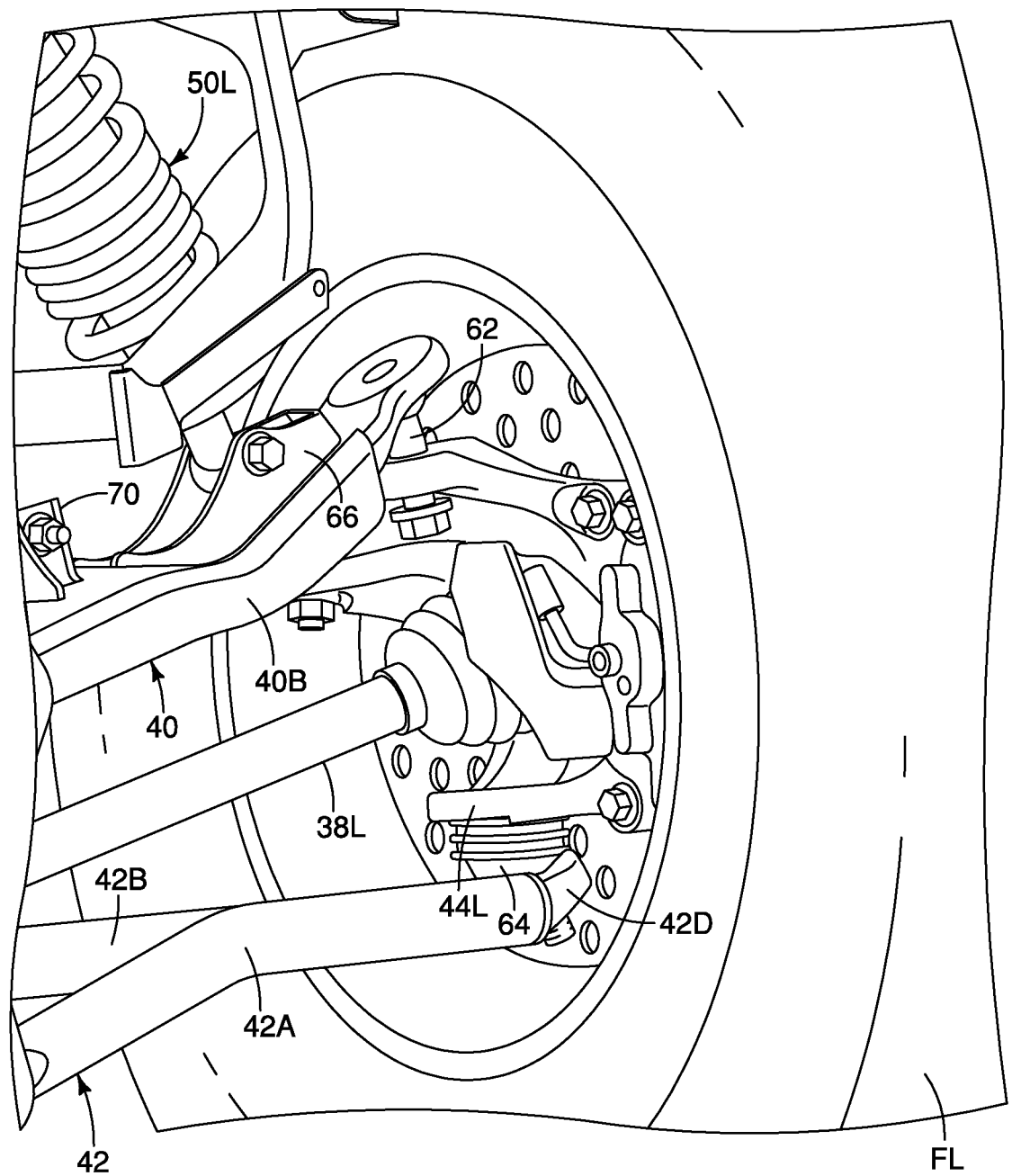
FIG. 19 is a partial front perspective view, similar to FIGS. 9, 11, 13 and 17, of selected parts of the vehicle front structure illustrated in FIG. 18 with the left front wheel in the straight position and in the full compression position.
Figure 20:
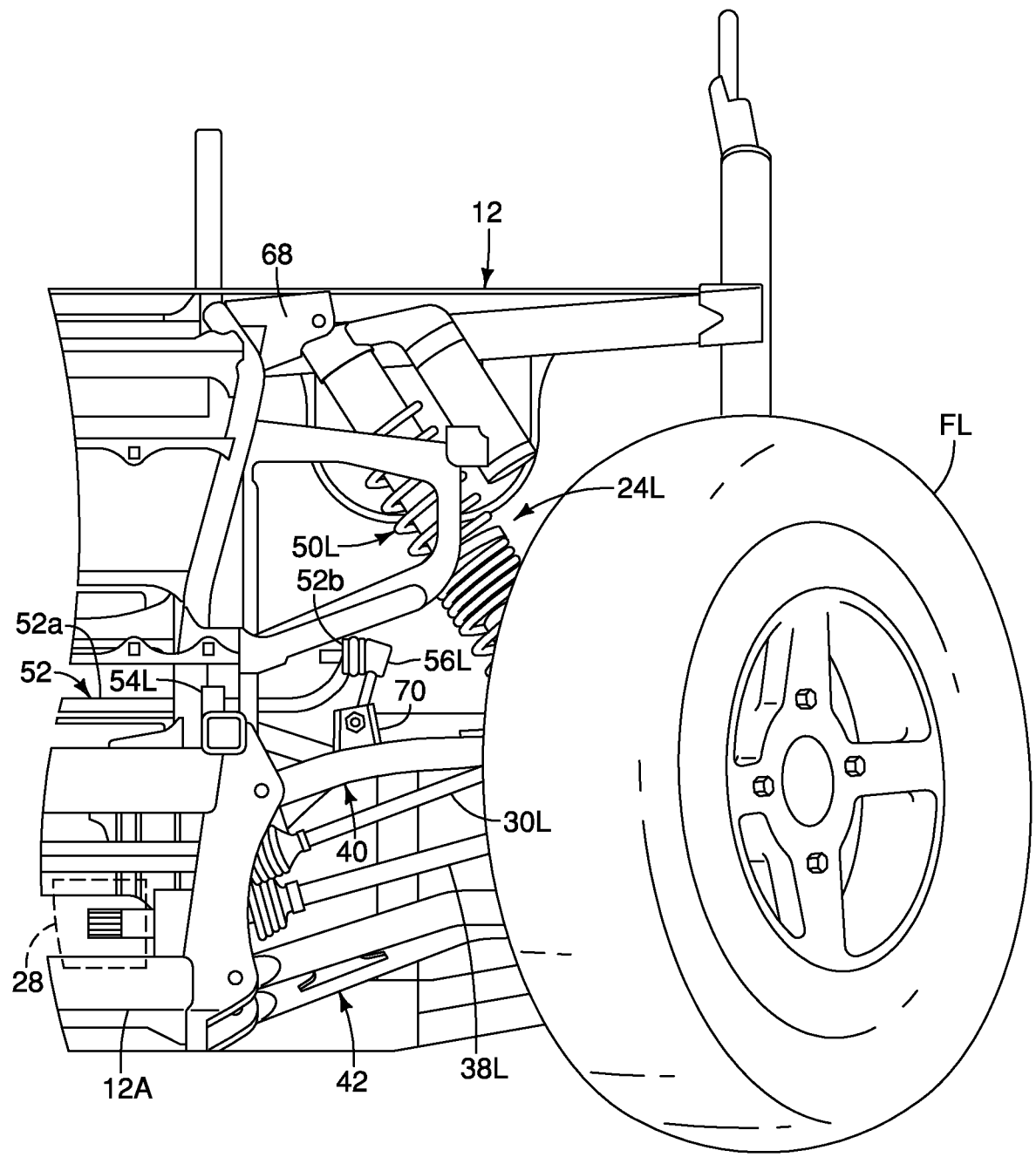
FIG. 20 is a partial front elevational view, similar to FIGS. 8, 10, 12, 14 and 18, of the selected parts of the left portion of the vehicle front structure illustrated in FIGS. 4 to 19 but with the left front wheel in the right turning position and in the full compression position.
Figure 21:
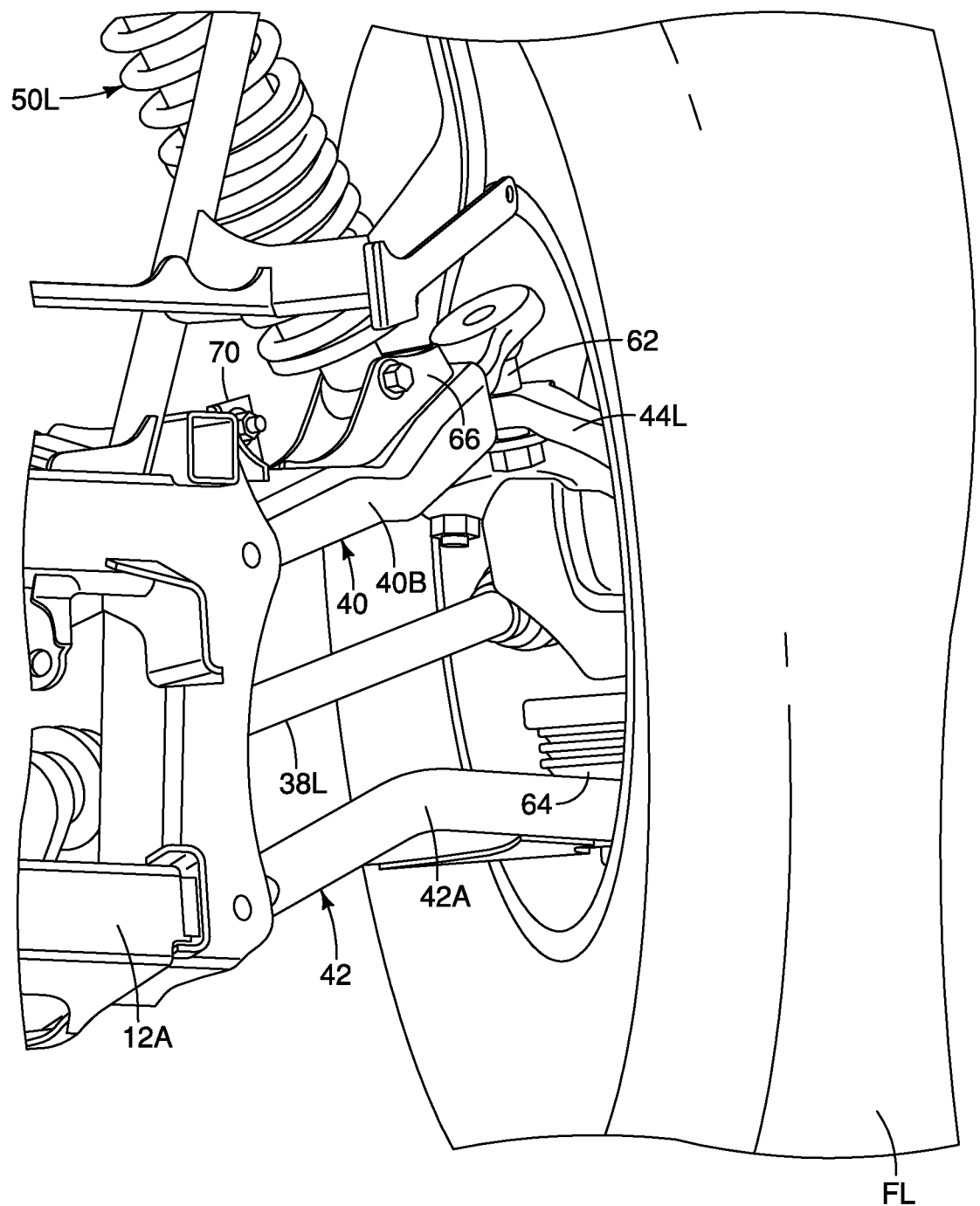
FIG. 21 is a partial front perspective view, similar to FIGS. 9, 11, 13, 17 and 19, of selected parts of the vehicle front structure illustrated in FIG. 20 with the left front wheel in the right turning position and in the full compression position.
Figure 22:
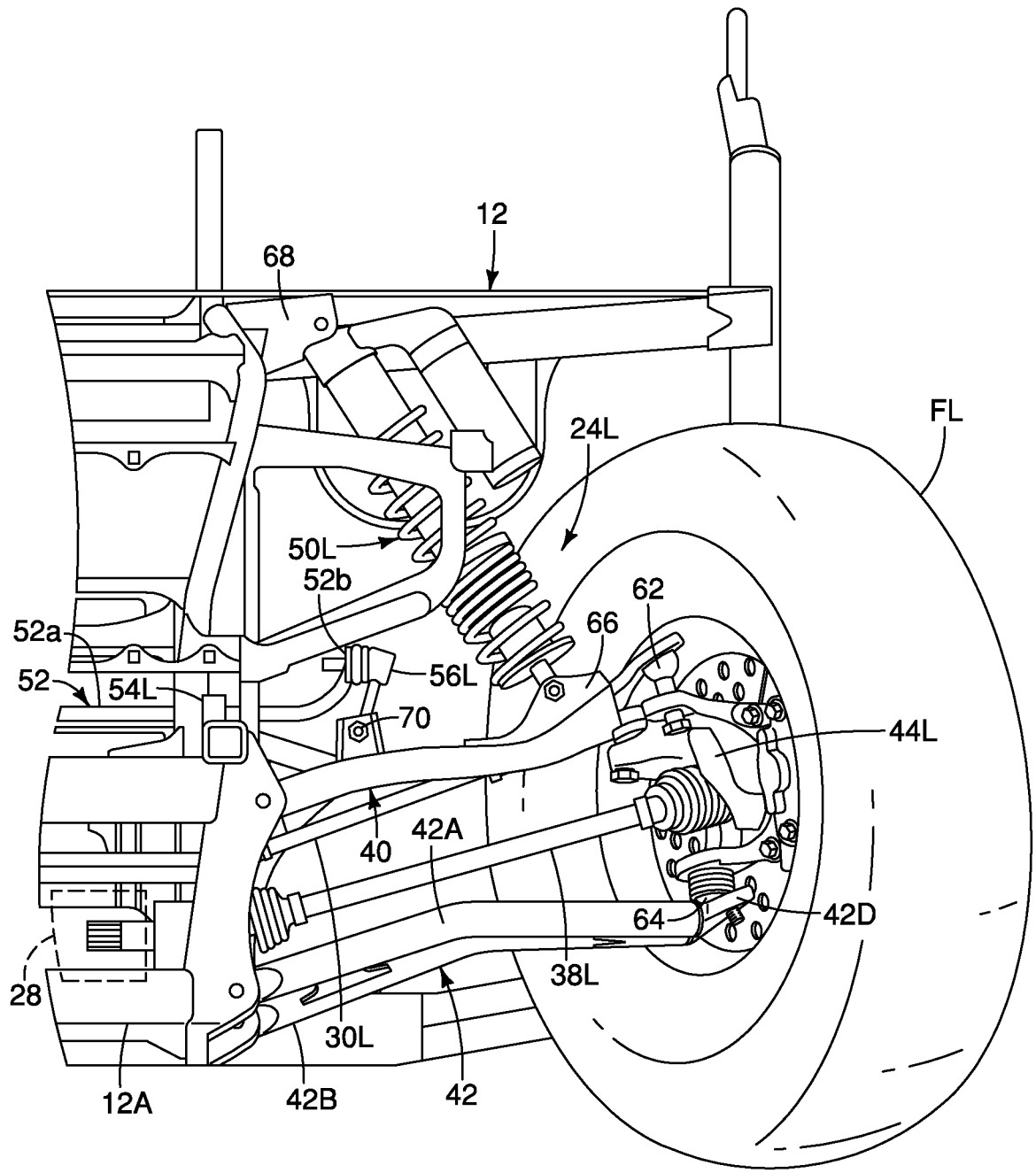
FIG. 22 is a partial front elevational view, similar to FIGS. 8, 10, 12, 14, 18 and 20, of the selected parts of the left portion of the vehicle front structure illustrated in FIGS. 4 to 21 but with the left front wheel in the left turning position and in the full compression position.
Figure 23:
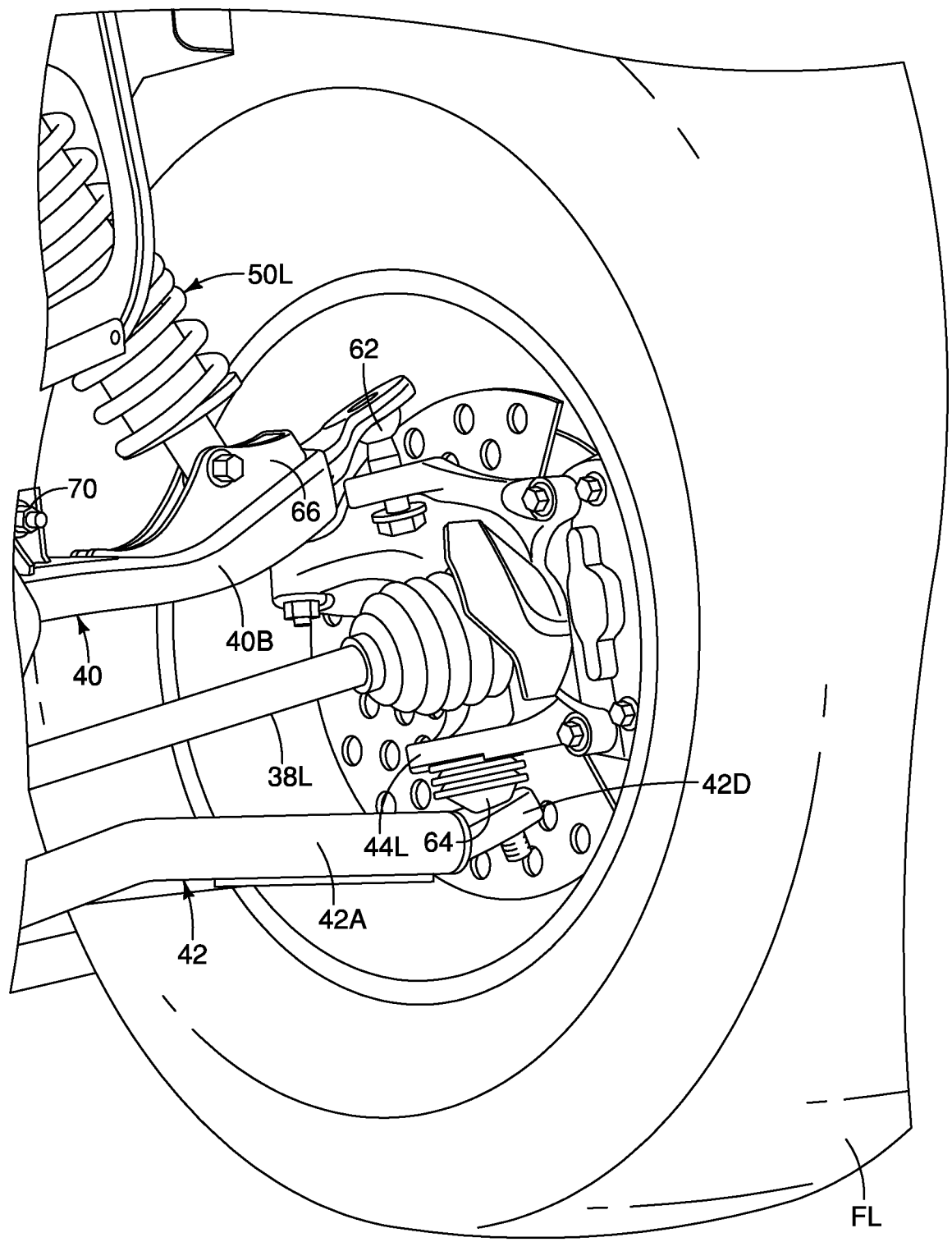
FIG. 23 is a partial front perspective view, similar to FIGS. 9, 11, 13, 17, 19 and 21, of selected parts of the left portion of the vehicle front structure illustrated in FIG. 22 with the left front wheel in the left turning position and in the full compression position.

In the illustrated embodiment, as seen in FIG. 7, the upper suspension arm 40 includes a first stamped arm part 40A and a second stamped arm part 40B that are fixed together. For example, the first stamped arm part 40A fixed to the second stamped arm part 40B by welding. The first and second stamped arm parts 40A and 40B are preferably metal plates that are stamped to the desired shapes. Here, the first stamped arm part 40A nests inside the second stamped arm part 40B. In particular, the first stamped arm part 40A is a contoured plate that fits in between a pair of downwardly extending flanges of the second stamped arm part 40B.

Figure 6:
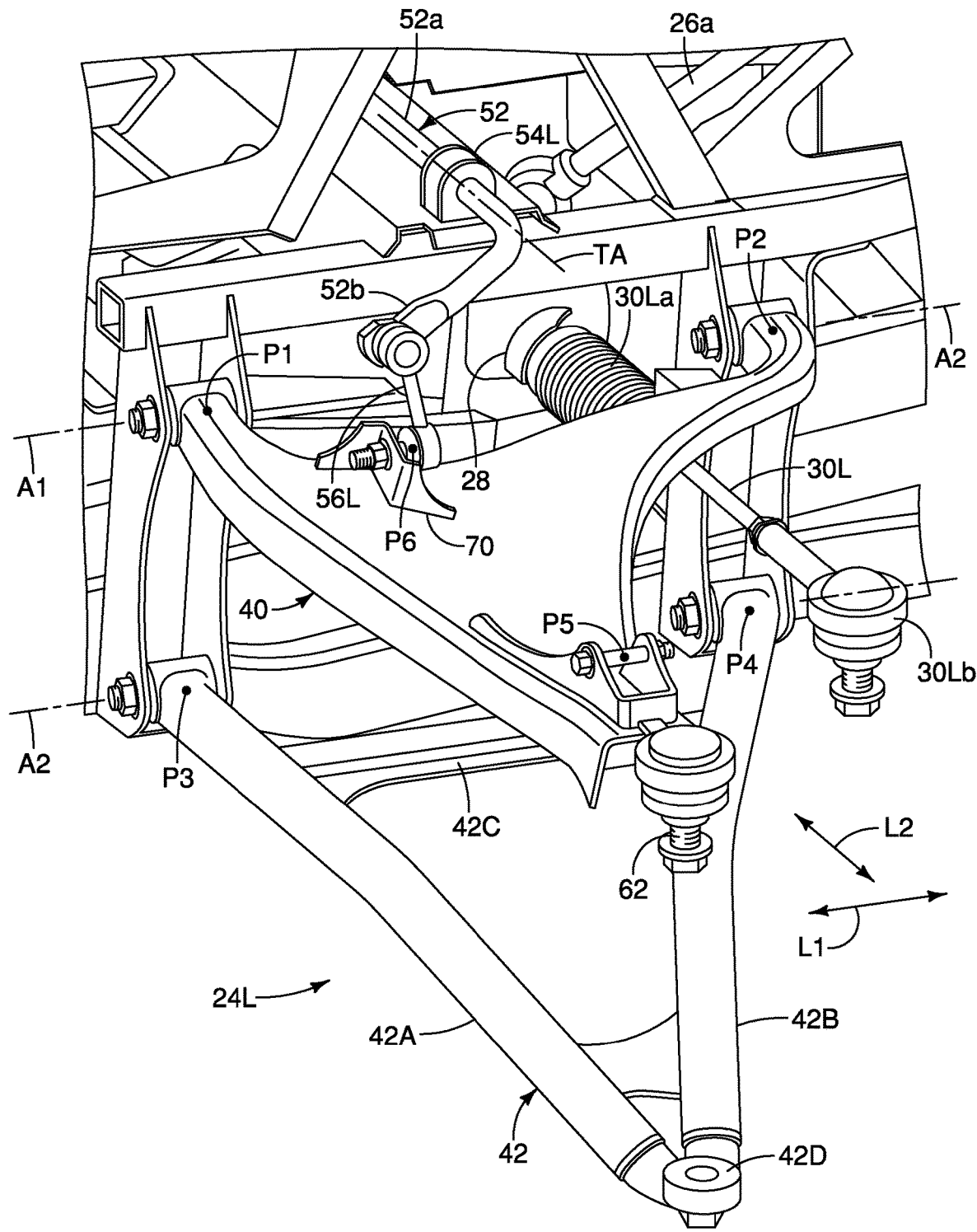
FIG. 6 is a partial perspective view of the selected parts of the left portion of the vehicle front structure illustrated in FIG. 5 with the vehicle front structure in the resting position (1 g of force)

As seen in FIGS. 5 and 6, the upper suspension arm 40 has a main body 40a, a necked portion 40b, a first arm part 40c and a second arm part 40d. The first arm part 40c has the first upper pivot point P1. The second arm part 40d has the second upper pivot point P1. The necked portion 40b has the ball joint 62. The first arm part 40c primarily extends from the main body 40a to the first upper pivot point P1 in the lateral vehicle direction L2 towards the vertical center plane CP. The second arm part 40d has a goose neck section 40d1 that primarily extends rearward from the main body 40a in the longitudinal vehicle direction L1 and then primarily extends in the lateral vehicle direction L2 to the second upper pivot point P1 towards the vertical center plane CP.

As seen in FIGS. 5 and 6, the lower suspension arm 42 is pivotally coupled to the vehicle frame 12 about first and second lower pivot points P3 and P4. The second lower pivot point P4 is located rearward of the first lower pivot point P3 with respect to the longitudinal vehicle direction L1. The lower suspension arm 42 is bolted to the vehicle frame 12 at the first lower pivot point P3 such that the bolt defines a third pivot axis A3, and bolted to the vehicle frame 12 at the second lower pivot point P4 such that the bolt defines a fourth pivot axis A4. The third and fourth pivot axes A3 and A4 are parallel to each other and preferably aligned. The third and fourth pivot axes A3 and A4 are parallel to the first and second pivot axes A1 and A2. In the illustrated embodiment, as seen in FIG. 6, the lower suspension arm 42 is primarily formed of a pair of tubes 42A and 42B, a brace 42C and an end connector 42D. The end connector 42D connects the outbound ends of the tubes 42A and 42B, while the brace 42C connects intermediate portions of the tubes 42A and 42B. Thus, the lower suspension arm 42 has an A-shape.

The knuckle 44L is pivotally supported on the outbound ends of the upper suspension arm 40 and the lower suspension arm 42. The knuckle 44L is turned in response to the steering wheel 24 being turned. In particular, turning of the steering wheel 24 causes the pinion gear of the rack and pinion steering 28 to rotate which in turn move the gear rack of the rack and pinion steering 28 in the lateral vehicle direction L2. This movement of the gear rack of the rack and pinion steering 28 in the lateral vehicle direction L2 causes the tie rod 30L to turn the knuckle 44L. In particular, the tie rod 30L has a first end 30La and a second end 30Lb. The first end 30La is operatively coupled to the gear rack of the rack and pinion steering 28. The second end 30Lb is pivotally coupled to the knuckle 44L. The tie rod 30L extends beneath the goose neck section 40d1 of the second arm part 40d. The tie rod 30L extends substantially perpendicular (±ten degrees) to the goose neck section 40d1 of the second arm part 40d as viewed from a top plan view as seen FIG. 3. Here, the first end 30La of the tie rod 30L is located slightly rearward of the second end 30Lb of the tie rod 30L.

The outbound end of the upper suspension arm 40 has a ball joint 62 that pivotally supports an upper end of knuckle 44L, while the outbound end of the lower suspension arm 42 has a ball joint 64 that pivotally supports a lower end of knuckle 44L. The ball joints 62 and 64 are located closer to the first upper pivot point P1 than the second upper pivot point P2 as viewed in the lateral vehicle direction L2 as seen in FIG. 5. Also, the ball joints 62 and 64 are located between the attachment point P6 of the sway bar 52 to the upper suspension arm 40 and the main torsion axis TA of the sway bar 52 as viewed in the lateral vehicle direction L2.

With this arrangement of the upper suspension arm 40 and the lower suspension arm 42, as seen in FIG. 5, the rack and pinion steering 28 is arranged between the upper and lower suspension arms 40 and 42. The rack and pinion steering 28 is located adjacent the second upper pivot point P2 and between the first and second upper pivot points P1 and P2 with respect to the longitudinal vehicle direction L1.

Also, with this arrangement of the upper suspension arm 40 and the lower suspension arm 42, as seen in FIG. 2, the front differential 34 is provided on the vehicle frame 12 at a location forward and below of the rack and pinion steering 28. As seen in FIG. 5, the front differential 34 is vertically aligned with a front shock absorber attachment point P5 of the upper suspension arm 40 as viewed in a lateral vehicle direction L2.

As mentioned above and as seen in FIG. 2, the front shock absorber SOL is coupled between the vehicle frame 12 and the upper suspension arm 40. Here, the front shock absorber SOL is pivotally coupled between the upper suspension arm 40 by an arm mount 66. Also, here, the front shock absorber SOL is pivotally coupled between the vehicle frame 12 by a frame mount 68. The arm mount 66 defines a front shock absorber attachment point P5 of the upper suspension arm 40 to the shock absorber 48. As seen in FIG. 5, the front shock absorber attachment point P5 is located closer to the first upper pivot point P1 than the second upper pivot point P2 as viewed in the lateral vehicle direction L2.

As mentioned above and as seen in FIGS. 5 and 6, the sway bar 52 is coupled to the upper suspension arm 40. In particular, the second end portion 52c of the sway bar 52 is pivotally coupled to the upper suspension arm 40 at an attachment point P6 by a bracket 70. The attachment point P6 of the upper suspension arm 40 to the sway bar 52 is located closer to the first upper pivot point P1 than the second upper pivot point P2 as viewed in the lateral vehicle direction L2. The sway bar 52 is attached to the vehicle frame 12 at a location rearward of the attachment point P6 of the upper suspension arm 40 to the sway bar 52. The sway bar 52 is located between the first and second upper pivot points P1 and P2 with respect to the longitudinal vehicle direction L1. In other words, the sway bar 52 is located between the first and second upper pivot points P1 and P2 as viewed in the lateral vehicle direction L2.

The vehicle 10 further comprises many other conventional vehicle components, such as an accelerator pedal, a brake system, a radiator, a radiator fan, a fuel tank, an electrical system, an exhaust system, various lights, various displays, gauges, etc. that are typically provided on recreational off-highway vehicles. However, for the sake of brevity, only those vehicle components needed to understand the present invention will be illustrated and/or discussed herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled"" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

It will be understood that, although the terms "first", "second", etc. may be used herein to describe various elements, components, regions, positions and/or sections, these elements, components, regions, positions and/or sections should not be limited by these terms. These terms are only used to distinguish one element, component, region, layer, position or section from another element, component, region, layer, position or section. Thus, a first element, component, region, position or section discussed above could be termed a second element, component, region, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a recreational off-highway vehicle on a flat horizontal surface and with to a direction in which a driver looks straight when seated on a driver's seat in a straightforward driving direction. The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle front structure comprising:
a vehicle frame;
an upper suspension arm pivotally coupled to the vehicle frame about first and second upper pivot points, the upper suspension arm having a main body, a necked portion with a ball joint, a first arm part with the first upper pivot point and a second arm part with the second upper pivot point, the main body having an upper surface that extends between the first arm part and the second arm part in a longitudinal vehicle direction;
a lower suspension arm pivotally coupled to the vehicle frame about first and second lower pivot points;
a sway bar coupled to the upper surface of the main body of the upper suspension arm via a control link and located above the upper suspension arm, the sway bar having a center bar portion that is pivotally attached to the vehicle frame and defines a main torsion axis of the sway bar, with the main torsion axis being located between the first and second upper pivot points with respect to the longitudinal vehicle direction, the control link being entirely located above the upper suspension arm; and
a rack and pinion steering arranged between the upper and lower suspension arms, the rack and pinion steering being located adjacent the second upper pivot point and between the first and second upper pivot points with respect to the longitudinal vehicle direction.

2. The vehicle front structure according to claim 1, further comprising
a front shock absorber coupled between the vehicle frame and the upper suspension arm, the shock absorber being attached to the upper suspension arm at a front shock absorber attachment point that is located closer to the first upper pivot point than to the second upper pivot point as viewed in a lateral vehicle direction.

3. The vehicle front structure according to claim 1, wherein
the sway bar is located between the first and second upper pivot points with respect to the longitudinal vehicle direction.

4. The vehicle front structure according to claim 1, wherein
the upper suspension arm includes a first stamped arm part and a second stamped arm part that are fixed together.

5. The vehicle front structure according to claim 1, further comprising
a front differential provided on the vehicle frame at a location forward and below of the rack and pinion steering.

6. The vehicle front structure according to claim 5, wherein
the front differential is vertically aligned with a front shock absorber attachment point of the upper suspension arm as viewed in a lateral vehicle direction.

7. The vehicle front structure according to claim 1, wherein
the first arm part primarily extends from the main body to the first upper pivot point in a lateral vehicle direction, and
the second arm part has a goose neck section that primarily extends from the main body in the longitudinal vehicle direction and then primarily extends in the lateral vehicle direction to the second upper pivot point.

8. The vehicle front structure according to claim 7, further comprising
a tie rod having a first end operatively coupled to the rack and pinion steering and a second end configured to be coupled to a knuckle, the tie rod extending beneath the goose neck section of the second arm part.

9. The vehicle front structure according to claim 7, wherein
the tie rod extends substantially perpendicular to the goose neck section of the second arm part as viewed from a top plan view.

10. The vehicle front structure according to claim 1, wherein
the second upper pivot point is located rearward of the first upper pivot point with respect to the longitudinal vehicle direction.

11. The vehicle front structure according to claim 1, wherein
the ball joint of the upper suspension arm is located closer to the first upper pivot point than the second upper pivot point as viewed in a lateral vehicle direction.

12. A vehicle front structure comprising:
a vehicle frame;
an upper suspension arm pivotally coupled to the vehicle frame about first and second upper pivot points, the upper suspension arm having a main body, a necked portion with a ball joint, a first arm part with the first upper pivot point and a second arm part with the second upper pivot point, the main body having an upper surface that extends between the first arm part and the second arm part in a longitudinal vehicle direction;
a lower suspension arm pivotally coupled to the vehicle frame about first and second lower pivot points;
a sway bar attached to the upper suspension arm and located above the upper suspension arm; and
a rack and pinion steering arranged between the upper and lower suspension arms, the rack and pinion steering being located adjacent the second upper pivot point and between the first and second upper pivot points with respect to the longitudinal vehicle direction,
the sway bar being coupled to the upper surface of the main body of the upper suspension arm via a control link at an attachment point that is located closer to the first upper pivot point than to the second upper pivot point as viewed in a lateral vehicle direction, the control link being entirely located above the upper suspension arm.

13. The vehicle front structure according to claim 12, wherein
the sway bar is attached to the vehicle frame rearward of the attachment point of the upper suspension arm to the sway bar.

14. A vehicle front structure comprising:
a vehicle frame;
an upper suspension arm pivotally coupled to the vehicle frame about first and second upper pivot points;
a lower suspension arm pivotally coupled to the vehicle frame about first and second lower pivot points;

a sway bar attached to the upper suspension arm and located above the upper suspension arm; and a rack and pinion steering arranged between the upper and lower suspension arms, the rack and pinion steering being located adjacent the second upper pivot point and between the first and second upper pivot points with respect to a longitudinal vehicle direction, the upper suspension arm having a ball joint that is located closer to the first upper pivot point than the second upper pivot point as viewed in a lateral vehicle direction, and the ball joint being located between an attachment point of the sway bar to the upper suspension arm and a main torsion axis of the sway bar and closer to the attachment point of the sway bar than the main torsion axis of the sway bar as viewed in the lateral vehicle direction.

\* \* \* \* \*